United States Patent [19]
Ishihara et al.

[11] Patent Number: 5,664,246
[45] Date of Patent: Sep. 2, 1997

[54] CAMERA COMPRISING FILM INFORMATION READOUT AND/OR READING MECHANISM

[75] Inventors: Masaaki Ishihara, Yokohama; Akira Egawa, Kawasaki; Chikara Aoshima, Zama, all of Japan

[73] Assignee: Canon Kabushiki Kaisha, Tokyo, Japan

[21] Appl. No.: 664,186

[22] Filed: Jun. 14, 1996

Related U.S. Application Data

[63] Continuation of Ser. No. 300,354, Sep. 2, 1994, abandoned, which is a continuation of Ser. No. 851,531, Mar. 13, 1992, abandoned.

[30] Foreign Application Priority Data

Mar. 14, 1991 [JP] Japan .................. 3-073740
Apr. 15, 1991 [JP] Japan .................. 3-108259
Jul. 29, 1991 [JP] Japan .................. 3-210394

[51] Int. Cl.$^6$ .................. G03B 1/18; G03B 17/24
[52] U.S. Cl. .................. 396/406; 396/319
[58] Field of Search .................. 354/105, 106, 354/109, 173.1, 173.11, 275, 21; 396/387, 406, 408, 410, 319

[56] References Cited

U.S. PATENT DOCUMENTS

| 4,565,432 | 1/1986 | Fukahori et al. ........... 354/173.11 |
| 4,579,435 | 4/1986 | Haraguchi .................. 354/173.1 |
| 4,693,574 | 9/1987 | Ohnuri et al. ............... 354/21 |
| 4,734,732 | 3/1988 | Nishio et al. ............... 354/173.11 |
| 4,834,306 | 5/1989 | Robertson et al. .......... 242/71.1 |
| 4,864,332 | 9/1989 | Harvey ...................... 354/21 |
| 4,987,437 | 1/1991 | Pagano et al. .............. 354/275 |
| 5,032,854 | 7/1991 | Smart et al. ................ 354/21 |
| 5,136,314 | 8/1992 | Kazami et al. .............. 354/173.1 |
| 5,172,148 | 12/1992 | Ezawa ...................... 354/173.1 |
| 5,245,372 | 9/1993 | Aoshima .................... 354/106 |

FOREIGN PATENT DOCUMENTS 5522799 2/1980 Japan .
0395532 4/1991 Japan .

*Primary Examiner*—Safet Metjahic
*Assistant Examiner*—Nicholas J. Tuccillo
*Attorney, Agent, or Firm*—Fitzpatrick, Cella, Harper & Scinto

[57] ABSTRACT

This invention relates to a camera for reading out and/or reading information from a magnetic recording portion provided to a film using a magnetic head.

This invention provides a camera, wherein the film feed speed until the film passes the head position is set to be lower than a predetermined speed, so that the film can be prevented from colliding against the head portion with a shock.

35 Claims, 26 Drawing Sheets

F I G. 26
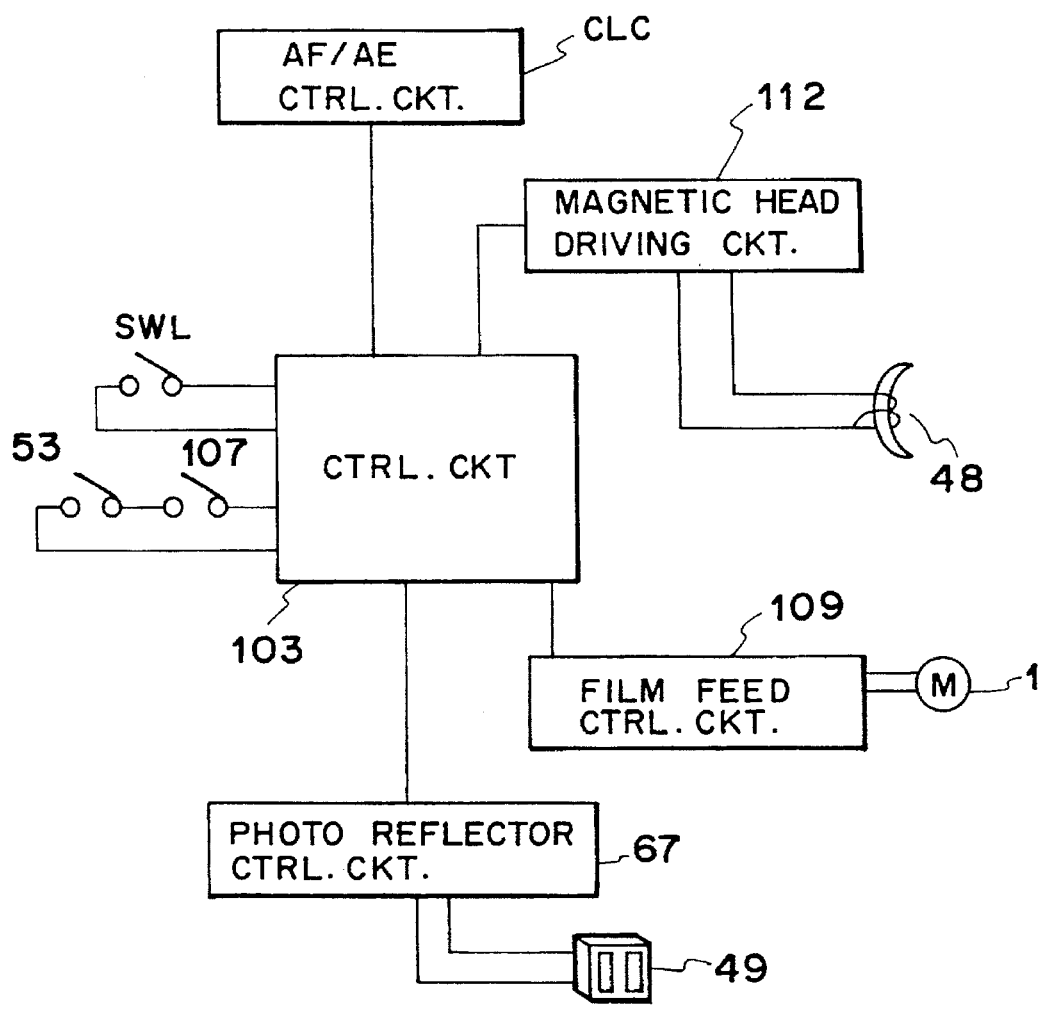

CAMERA COMPRISING FILM INFORMATION READOUT AND/OR READING MECHANISM

This application is a continuation of application Ser. No. 08/300,354 filed Sept. 2, 1994, which is a continuation of application Ser. No. 07/851,531 filed Mar. 13, 1992, both now abandoned.

BACKGROUND OF THE INVENTION

1. Field of the Invention

The present invention relates to an improvement in a camera using a film with a magnetic storage portion.

2. Related Background Art

In a conventional film feeding apparatus of a camera, when the tip end portion (so-called leader portion) of a film is engaged with a sprocket or film take-up spool of a camera, the sprocket or film take-up spool is driven to load the film. With a film feeding apparatus of this type, however, a user must set the tip end of a film, resulting in cumbersome operations. If a user sets the tip end of a film at a wrong position, the film cannot be satisfactorily loaded. In addition, when a user carelessly pulls the tip end of a film, the film is unexpectedly exposed, and can no longer be used.

For this reason, the following film cartridge of a new type is proposed in U.S. Pat. No. 4,834,306.

The film cartridge comprises a film passage slit, a film one end of which is fixed to a feed spool, and which is wound around the feed spool, a pressing member which is arranged coaxially with the feed spool, and regulates the outermost circumferential portion of the film from extending radially so as to substantially prevent the outermost circumferential portion of the film from contacting the inner wall of the film cartridge, a release portion for continuously releasing the outermost circumferential portion of the film from radial regulation of the pressing member, and a guide portion for guiding a portion of the film released from regulation toward the film passage slit. The outermost circumferential portion of the film and the pressing member are set in a slide-free state by extension of the outermost circumferential portion by a loose winding state of the film caused by rotation of the feed spool in a film thrust direction of the film, and a driving force in the thrust direction is applied to the film, thus allowing the film to be thrusted from the film cartridge. In the following description, a film cartridge of this type which can exhaust a film upon rotation of a feed spool will be referred to as a thrust type film cartridge.

FIGS. 16 and 17 show the thrust type film cartridge. FIG. 16 is a longitudinal sectional view of the cartridge, and FIG. 17 is a cross-sectional view thereof.

In FIGS. 16 and 17, a thrust type cartridge 302 comprises a film 301, a film passage slit 303, a feed spool 304, a fixing portion 304a for fixing one end of the film 301, a pressing member 305, a regulating portion 305a, a release portion 306, and a guide portion 307.

When the thrust type film cartridge 302 is used, after the cartridge is loaded in a camera, the feed spool 304 of the cartridge 302 is rotated by a fork to exhaust the film 301. The film 301 is pushed out until it is wound around a film take-up spool of the camera. Thereafter, the film 301 is fed by the film take-up spool. With this arrangement, a user need not touch the tip end portion of the film 301, thus eliminating the conventional drawback.

Recently, U.S. Pat. No. 4,864,332 discloses a camera, which uses a film having a magnetic storage portion, and writes photographing information such as a shutter speed, an aperture value, a date, a title, and the like in the magnetic storage portion using a magnetic head, or reads out a film speed or the like, which has already been written in the magnetic storage portion.

In a camera of this type, in order to reliably write or read information in or from a film with a magnetic storage portion using a magnetic head, a structure for urging the magnetic storage portion against the magnetic head with a given pressure, so that the magnetic head can reliably contact the magnetic storage portion, is required. For this purpose, a film urging member such as a pad must be arranged at a position opposing the magnetic head to sandwich the film therebetween. Therefore, when the film with the magnetic storage portion is used in the thrust type film cartridge, the following problems are posed.

1) When a film urging member is urged beforehand against a magnetic head by an elastic member such as a spring, if a film thrust operation is performed at a high speed, a load generated when the tip end of a film is inserted into a gap between the magnetic head and the film urging member becomes a shock force, and the film may buckle or may be damaged.

2) When a film urging member or a magnetic head is movable by another motor in a direction of thickness of a film, and the film urging member or the magnetic head is escaped in the direction of thickness of the film until the tip end of the film passes the position of the magnetic head and the film urging member by a film thrust operation, a driving source such as the motor is required, resulting in high cost. A timing for urging the film against the magnetic head becomes complex, and as a result, an electrical circuit becomes complicated.

This problem is particularly serious when a motor drive unit is attached to a camera, and a film is fed at high speed by the motor drive unit in place of a film feed circuit incorporated in the camera.

Japanese Patent Application Laid-Open No. 55-22799 discloses a camera, which records, as magnetic information, information associated with a film on a member moved integrally with a film feed operation, and reads the information in the film feed operation.

SUMMARY OF THE INVENTION

One aspect of the application has as its object to provide a camera using a film with a magnetic storage portion, which camera allows a film to enter and pass between a magnetic head and a film urging means, a film aperture portion, and a film passage slit without buckling or being damaged during a film thrust operation, and can successfully wind a film.

Under the above-mentioned object, one aspect of the application provides a camera comprising a detection means for detecting that the tip end of a film passes between a magnetic head and a film urging means after a film thrust operation is started by a fork, and a control means for controlling a rotation speed of a film driving motor in a film thrust direction to be equal to or lower than a predetermined rotation speed until detection of the detection means is made.

Under the above-mentioned object, one aspect of the application provides a camera which can mount a high-speed feed device capable of preventing buckling of and damage to the tip end of a film upon a film thrust operation even when such a high-speed feed device is mounted to allow a high-speed film feed operation.

Under the above-mentioned object, one aspect of the application provides a camera comprising a feed control means for, even when a high-speed feed device is attached, and a high-speed film feed mode is set, inhibiting a film feed operation by the high-speed feed device, and instructing a film feed operation by a feed means from when a film thrust operation is started from a thrust type film cartridge until the tip end of a film passes a predetermined position.

One aspect of the application provides a camera which can reliably read information from a disc which records information associated with a film, and is rotated in a film feed operation.

One aspect of the application provides a camera, which comprises an information read means for reading out symbolic information on a disc upon rotation of a film feed spool, a film feed means for feeding a film, and a feeding speed switching means for switching a feeding speed of the film feed means, and causes the feeding speed switching means to switch the film feeding speed when the information read means reads out the symbolic information on the disc.

Other objects of the present invention will become apparent from the following description of the embodiment taken in conjunction with the accompanying drawings.

BRIEF DESCRIPTION OF THE DRAWINGS

FIG. 26 is a block diagram of an electrical circuit according to the seventh embodiment of the present invention;

DETAILED DESCRIPTION OF THE PREFERRED EMBODIMENTS

The preferred embodiments of the present invention will be described hereinafter with reference to the accompanying drawings.

Figure 1:
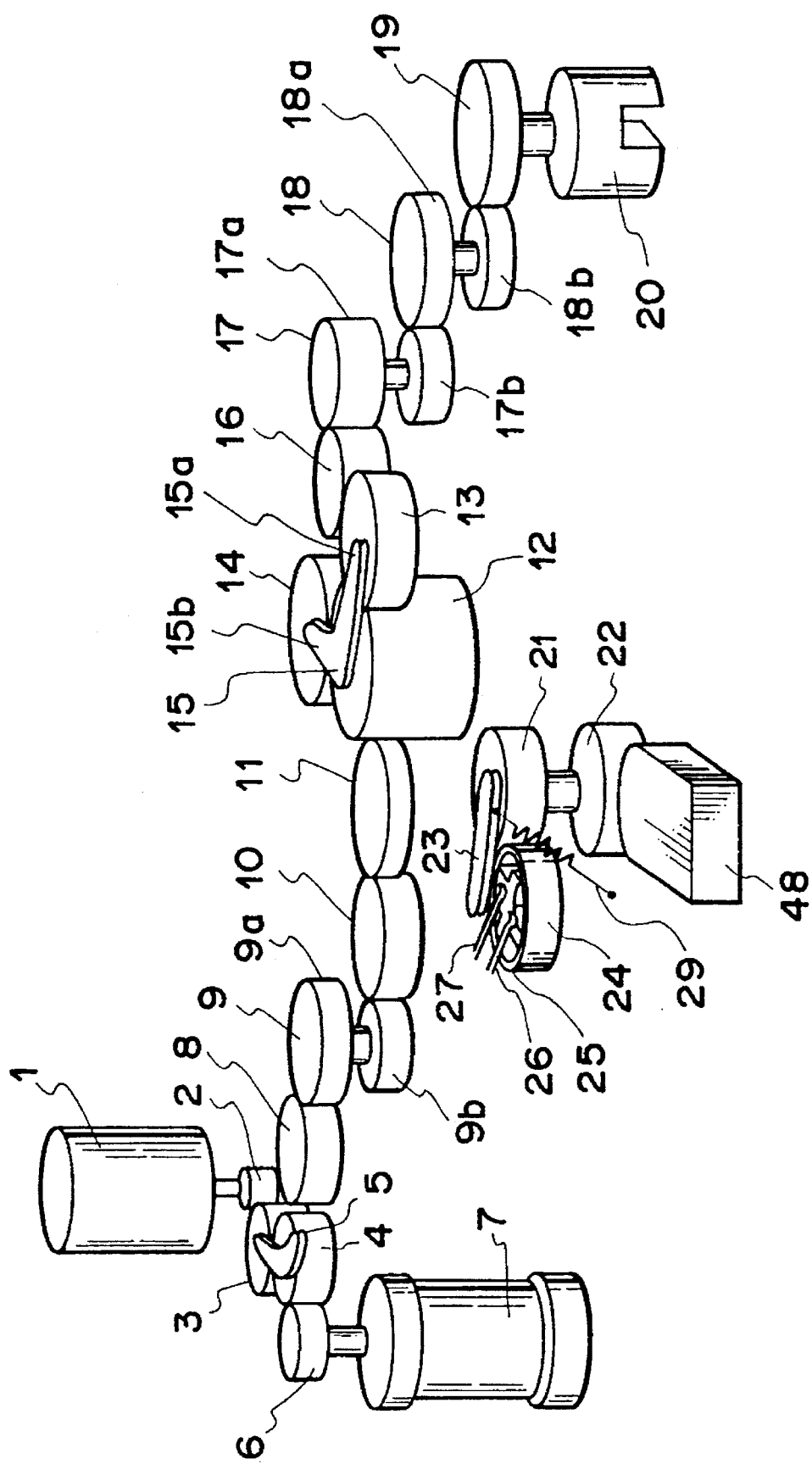
FIG. 1 is a perspective view showing a film feed mechanism of a camera according to the preferred embodiments of the present invention.
Figure 2:
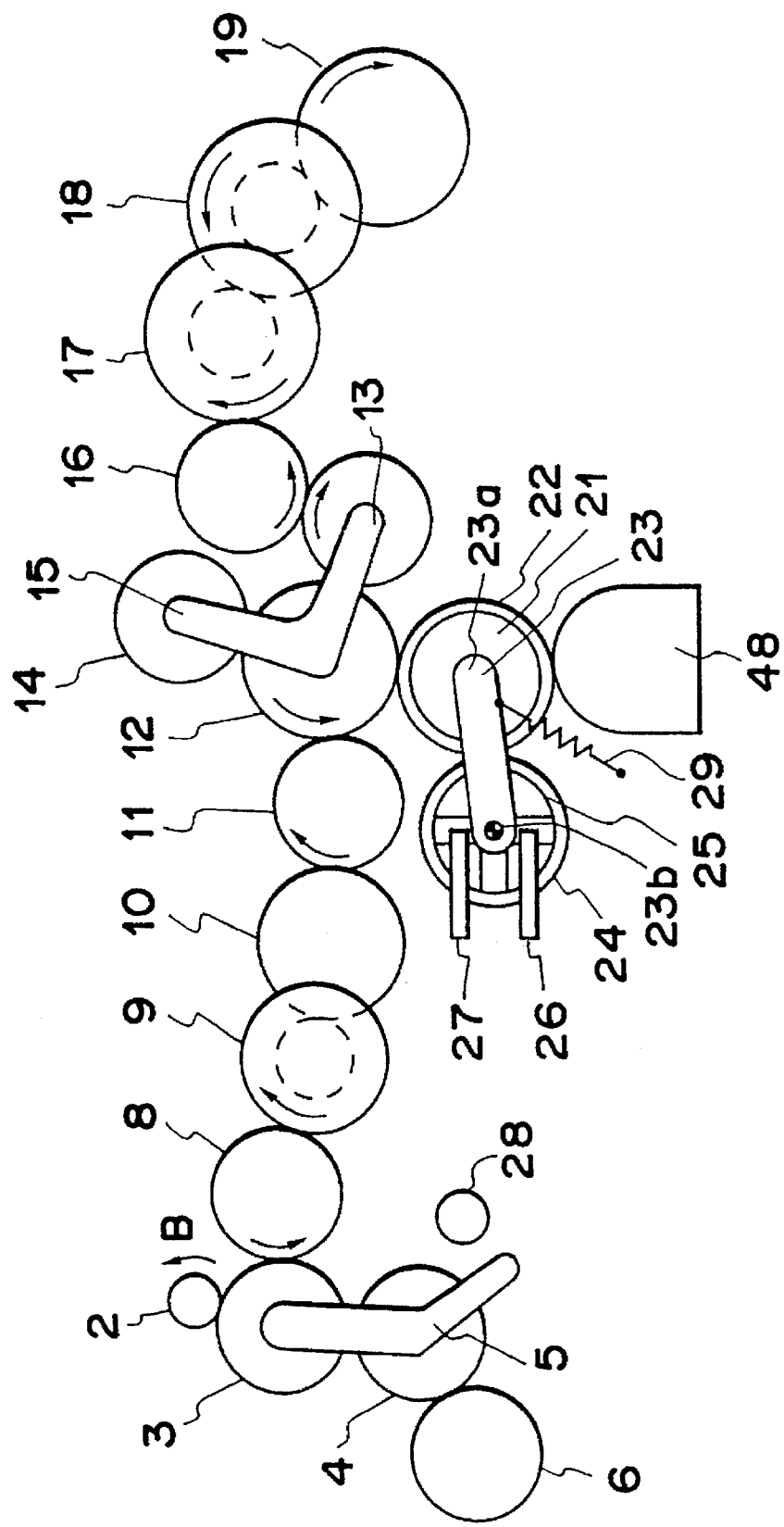
FIG. 2 is a plan view showing a gear train in a film winding operation of the film feed mechanism shown in FIG. 1.
Figure 3:
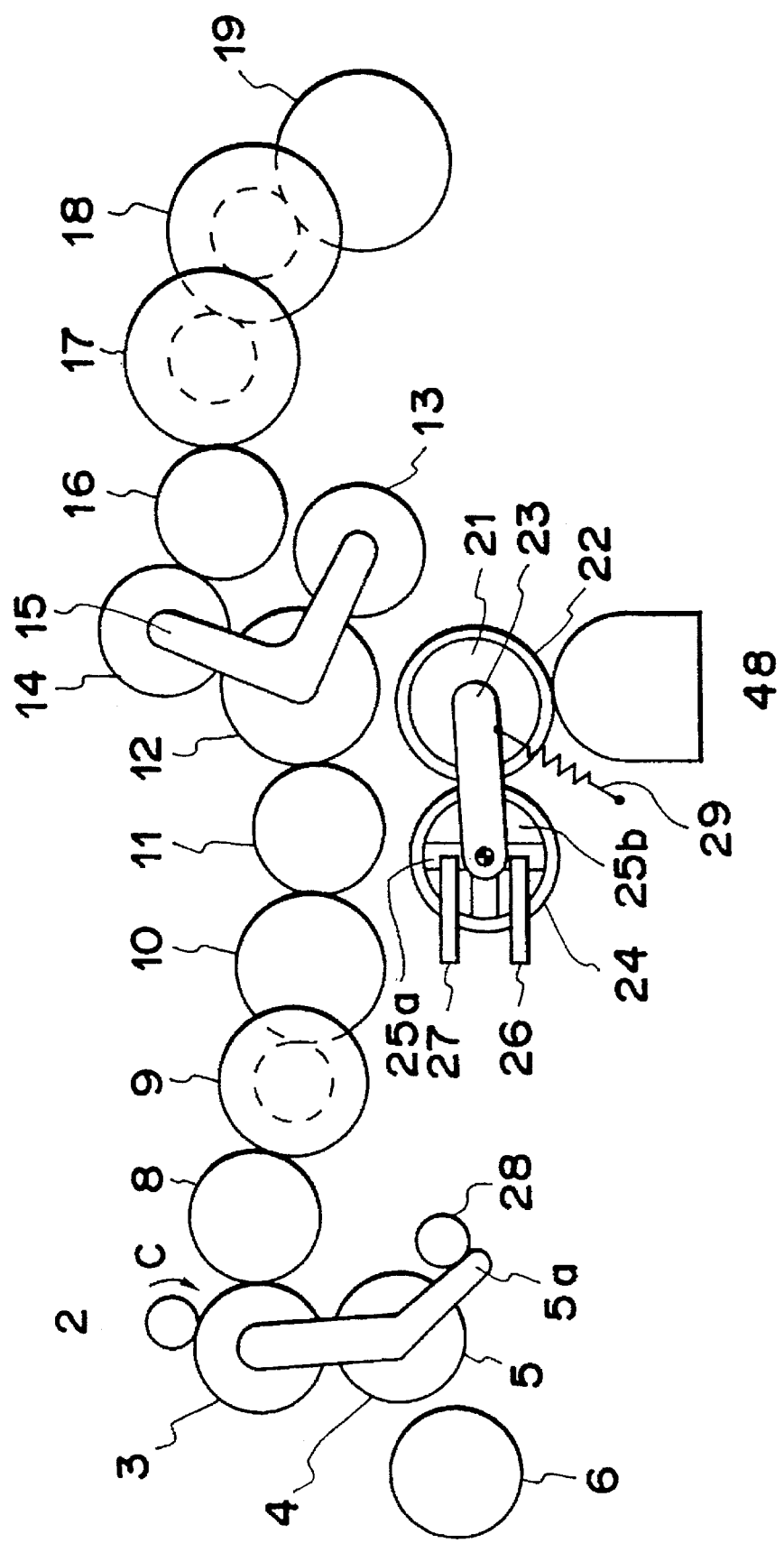
FIG. 3 is a plan view showing the gear train in a film rewinding operation of the film feed mechanism shown in FIG. 1.
Figure 4:
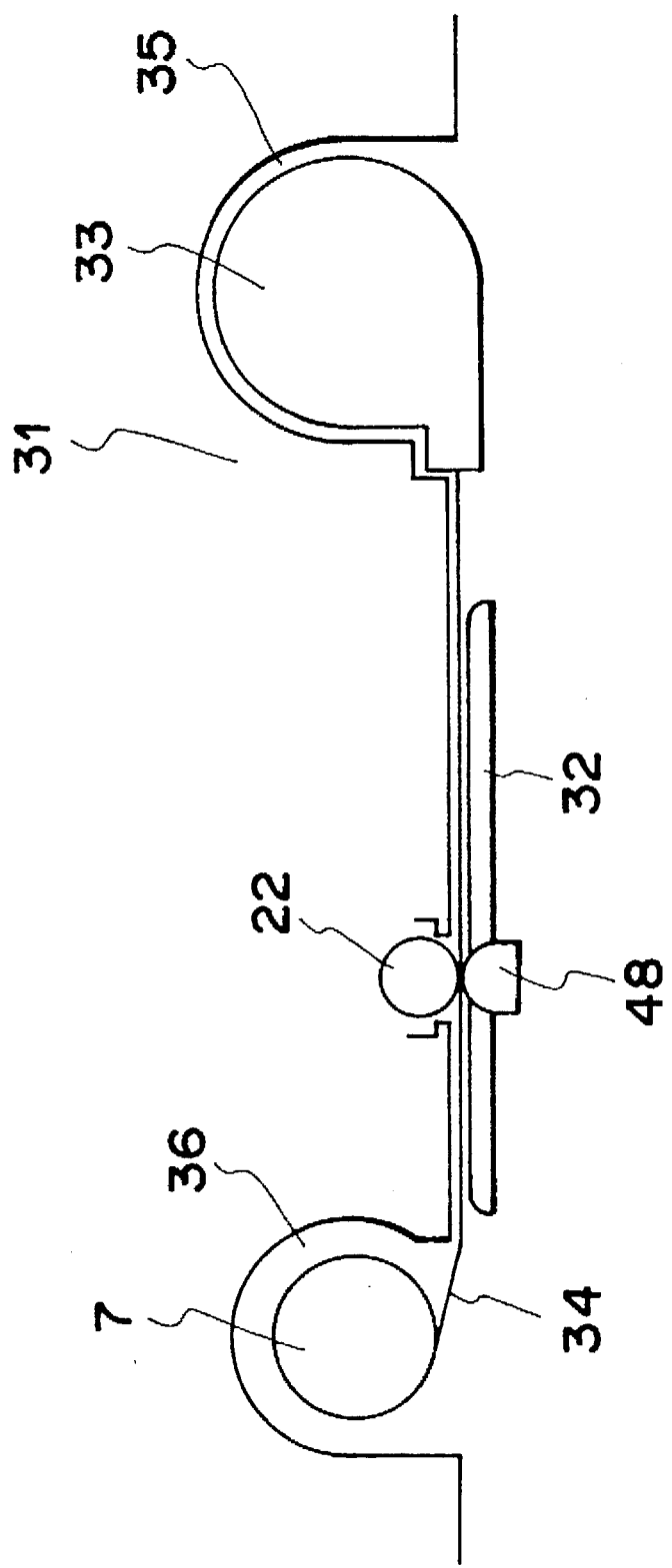
FIG. 4 is a cross-sectional view showing an arrangement of principal part of the camera according to the preferred embodiments of the present invention.

FIGS. 1 to 4 show the mechanical arrangement according to the preferred embodiments of the present invention. FIG. 1 is a perspective view of a film feed mechanism, FIG. 2 is a plan view of a gear train in a film winding operation, FIG. 3 is a plan view of the gear train in a film rewinding operation, and FIG. 4 is a cross-sectional view of a principal part of a camera.

Referring to FIGS. 1 to 4, a film driving motor 1 is rotated in a normal direction (in a direction of an arrow B in FIG.

2) in a film winding operation, and is rotated in a reverse direction (in a direction of an arrow C in FIG. 3) in a film rewinding operation. A pinion gear 2 is fixed to the rotation shaft of the motor 1. A first sun gear 3 meshes with the pinion gear 2. A first planetary gear 4 meshes with the first sun gear 3. A first coupling lever 5 couples the first sun gear 3 and the first planetary gear 4. The lever 5 rotatably holds the first planetary gear 4 while generating a frictional force between itself and the first planetary gear 4. In addition, the lever 5 causes the first planetary gear 4 to revolve around the first sun gear 3 as the rotation center upon rotation of the first sun gear 3. The first sun gear 3, the first planetary gear 4, and the first coupling lever 5 constitute a known planetary gear mechanism.

A spool gear 6 meshes with the first planetary gear 4 only when the film driving motor 1 is rotated in the normal direction. A film take-up spool 7 is fixed to the spool gear 6, and is moved integrally therewith.

A first idler gear 8 always meshes with the first sun gear 3. A first two-staged gear 9 has a large gear portion 9a and a small gear portion 9b, and the large gear portion 9a meshes with the first idler gear 8. A second idler gear 10 meshes with the small gear portion 9b of the first two-staged gear 9. A third idler gear 11 meshes with the second idler gear 10. A second sun gear 12 meshes with the third idler gear 11. A second planetary gear 13 meshes with the second sun gear 12. A third planetary gear 14 meshes with the second sun gear in the same manner as the second planetary gear 13. A second coupling lever 15 couples the second sun gear 12, and the second and third planetary gears 13 and 14 by its arm portions 15a and 15b, respectively. The lever 15 rotatably holds these planetary gears while generating a frictional force. The lever 15 causes the second and third planetary gears 13 and 14 to revolve around the second sun gear 12 as the rotation center upon rotation of the second sun gear 12. The second sun gear 12, the second and third planetary gears 13 and 14, and the second coupling lever 15 constitute a known planetary gear mechanism.

A fourth idler gear 16 meshes with the second planetary gear 13 and does not mesh with the third planetary gear 14 upon counterclockwise rotation of the second coupling lever 15 about the second sun gear 12 when the film driving motor 1 is rotated in the normal direction. When the film driving motor 1 is rotated in the reverse direction, the gear 16 meshes with the third planetary gear 14 and does not mesh with the second planetary gear 13 upon clockwise rotation of the second coupling lever 15. A second two-staged gear 17 has a large gear portion 17a and a small gear portion 17b, and the large gear portion 17a meshes with the fourth idler gear 16. A third two-staged gear 18 has a large gear portion 18a and a small gear portion 18b, and the large gear portion 18a meshes with the small gear portion 17b of the second two-staged gear 17. A fork gear 19 meshes with the small gear portion 18b of the third two-staged gear 18. A fork 20 is rotated integrally with the fork gear 19. The feed spool in a film cartridge 33 is rotated by the fork 20, thereby pushing out and winding a film 34 from and into the cartridge 33.

A roller member 22 is fixed to a roller gear 21. The outer circumferential portion of the roller member 22 is formed of a rubber, or is knurled to prevent slipping. A roller lever 23 pivotally holds the roller gear 21 by a portion 23a, and is attached to a camera main body to be concentrical with the rotation center of a pulse gear 24, i.e., to be pivotal about a portion 23b.

The pulse gear 24 meshes with the roller gear 21. A pulse plate 25 has a conductive portion 25a and a non-conductive portion 25b, and is fixed on the pulse gear 24. Segments 26 and 27 are used for detecting pulses corresponding to the rotation amount of the roller member 23 by the conductive and non-conductive portions 25a and 25b of the pulse plate 25.

A stopper 28 (FIGS. 2 and 3) is fixed to a base plate (not shown). The stopper 28 regulates the rotation position of counterclockwise rotation of the first coupling lever 5 when it contacts an end portion 5a of the first coupling lever 5. One end of a coil spring 29 is attached to the roller lever 23, and the other end thereof is attached to the camera main body. The coil spring 29 applies a clockwise biasing force to the roller lever 23, thereby pressing the roller member 22 toward a magnetic head 48.

The camera of this embodiment also has a camera main body 31 (FIG. 4), a pressing plate 32, a cartridge chamber 35, and a spool chamber 36. The magnetic head 48 is attached to the pressing plate 32.

The above-mentioned roller member 22 is arranged, as shown in FIG. 4, and is attached so that a predetermined pressure is applied to the magnetic head 48 (by the coil spring 29) so as to stably bring a magnetic storage portion (not shown) of the film 34 to be in contact with the magnetic head 48 (i.e., a magnetic gap portion thereof). As can be understood from the above description, the roller member 22 forms one film feeding system, and is rotated upon movement of the film 34. The pulse plate 25 is rotated through the roller gear 21 to be interlocked with the rotation of the roller member 22, and generates pulse signals by the segments 26 and 27.

In the above-mentioned arrangement, after the film cartridge 33 is loaded in the cartridge chamber 35, when the film driving motor 1 (pinion gear 2) is rotated in the direction of the arrow B (in the normal direction), as shown in FIG. 2, the first sun gear 3 is rotated clockwise upon rotation of the gear 3, the first planetary gear 4 revolves to have the first sun gear 3 as the rotation center by operation of the first coupling lever 5, and then, meshes with the spool gear 6. As a result, the driving force of the film driving motor 1 is transmitted to the spool gear 6, and the film take-up spool 7 is rotated clockwise.

Through the idler gear 8 as another gear meshing with the first sun gear 3, the driving force is also transmitted to the second sun gear 12 through the first two-staged gear 9, the second idler gear 10, and the third idler gear 11. Since the second sun gear 12 is rotated counterclockwise, the second and third planetary gears 13 and 14 revolve counterclockwise to have the second sun gear as the rotation center by operation of the second coupling lever 15, and then, the second planetary gear 13 meshes with the fourth idler gear 16. Thus, the driving force of the film driving motor 1 in the direction of the arrow B is transmitted to the fourth idler gear 16 as a counterclockwise driving force, and is also transmitted to the fork gear 19 through the second and third two-staged gears 17 and 18, thereby rotating the fork 20 clockwise.

The gear ratio of this gear train is set as follows.

If the peripheral velocity of the film take-up spool 7 is represented by "V1", and the push-out speed of the film 34 from the film cartridge 33 is represented by "V2", a relation "V1>V2" is satisfied.

When the film 34 is pushed out from the film cartridge 33 upon clockwise rotation of the fork 20, since the roller member 22 always urges the magnetic storage portion of the film 34 against the magnetic head 48, the tip end of the film contacts the roller member 22 and the magnetic head 48. In this case, the relation "V1>V2" is satisfied. However, if "V1" itself has a large value, the film may buckle or may be damaged by a shock force when the tip end of the film contacts the roller member 22 and the magnetic head 48. In addition, as for the gear ratio, "V1" cannot be decreased in terms of a gear arrangement, and in order to guarantee an output from the magnetic head 48. For these reasons, the degree of reduction in "V2" obtained by adjustment of only the gear ratio is limited.

In this embodiment, when the tip end of the film passes a portion of the magnetic head 48, the rotation speed (the number of revolutions per unit time) of the motor 1 is decreased, as will be described later. For this reason, a shock force generated when the tip end of the film passes the portion of the magnetic head 48 can be decreased. Thus, the tip end of the film can be prevented from buckling or being damaged.

When the film 34 is further fed, and is wound around the film take-up spool 7 by a known means (e.g., hooking perforations of the film 34 by pawls provided to the film take-up spool 7, or by a means provided to the camera main body 31), the film 34 is fed by the film take-up spool 7 due to the relation "V1>V2". The driving force (speed) is transmitted through the film 34 in the order of the fork gear 19, the third two-staged gear 18, the second two-staged gear 17, and the fourth idler gear 16. Thus, the counterclockwise rotation speed of the fourth idler gear 16 becomes higher than the clockwise rotation speed of the second planetary gear 13. In this case, the fourth idler gear 16 bumps off the second planetary gear 13, and a meshing state between the second planetary gear 13 and the fourth idler gear 16 is temporarily released, thereby absorbing any speed difference between these two gears.

At this time, the feed amount, speed, and the like of the film 34 can be obtained by an encoder circuit (to be described later) on the basis of the pulse signals generated by the pulse plate 25, and its segments 26 and 27. Furthermore, since the relation "V1>V2" is satisfied, the feeding speed considerably changes when the film 34 is wound around the film take-up spool 7. Whether or not an auto-loading operation is ended can be discriminated by paying attention to this speed change.

A film rewinding operation will be explained below.

This operation will be described with reference to FIG. 3. When the film driving motor 1 is rotated in the direction of the arrow C, the first coupling lever 5 and the first planetary gear 4 revolve counterclockwise to have the first sun gear 3 as the rotation center until the end portion 5a of the first coupling lever 5 contacts the stopper 28. Thus, the meshing state between the first planetary gear 4 and the spool gear 6 is released.

The second sun gear 12 is rotated clockwise. Thus, the second and third planetary gears 13 and 14 revolve clockwise to have the second sun gear 12 as the rotation center due to operation of the second coupling lever 15, and the meshing state between the fourth idler gear 16 and the second planetary gear 13 is released. Instead, the fourth idler gear 16 meshes with the third planetary gear 14. Therefore, the fork gear 19 is rotated counterclockwise, and a feed spool (not shown) in the film cartridge 33 is rotated in the reverse direction by the fork 20, thereby winding the film 34 into the cartridge 33.

In this manner, when the film 34 is wound into the film cartridge 33, the tip end of the film then passes the roller member 22, and the roller member 22 stops its rotation. For this reason, no further pulse signal is generated between the pulse plate 25 and the segments 26 and 27. Thereafter, after the film rewinding operation is continued for a predetermined period of time, the motor 1 is stopped, thus completing the film rewinding operation (a detailed description thereof will be made later).

The detection results of the feed amount, speed, and the like of the film 34 are used for performing desired magnetic storage at a predetermined position of the magnetic storage portion in synchronism with the magnetic head 48 in, e.g., a magnetic recording mode. Furthermore, these detection results can also be used in one-frame feed control of the film 34, an information write operation by an optical means such as an LED, and the like.

Figure 5:
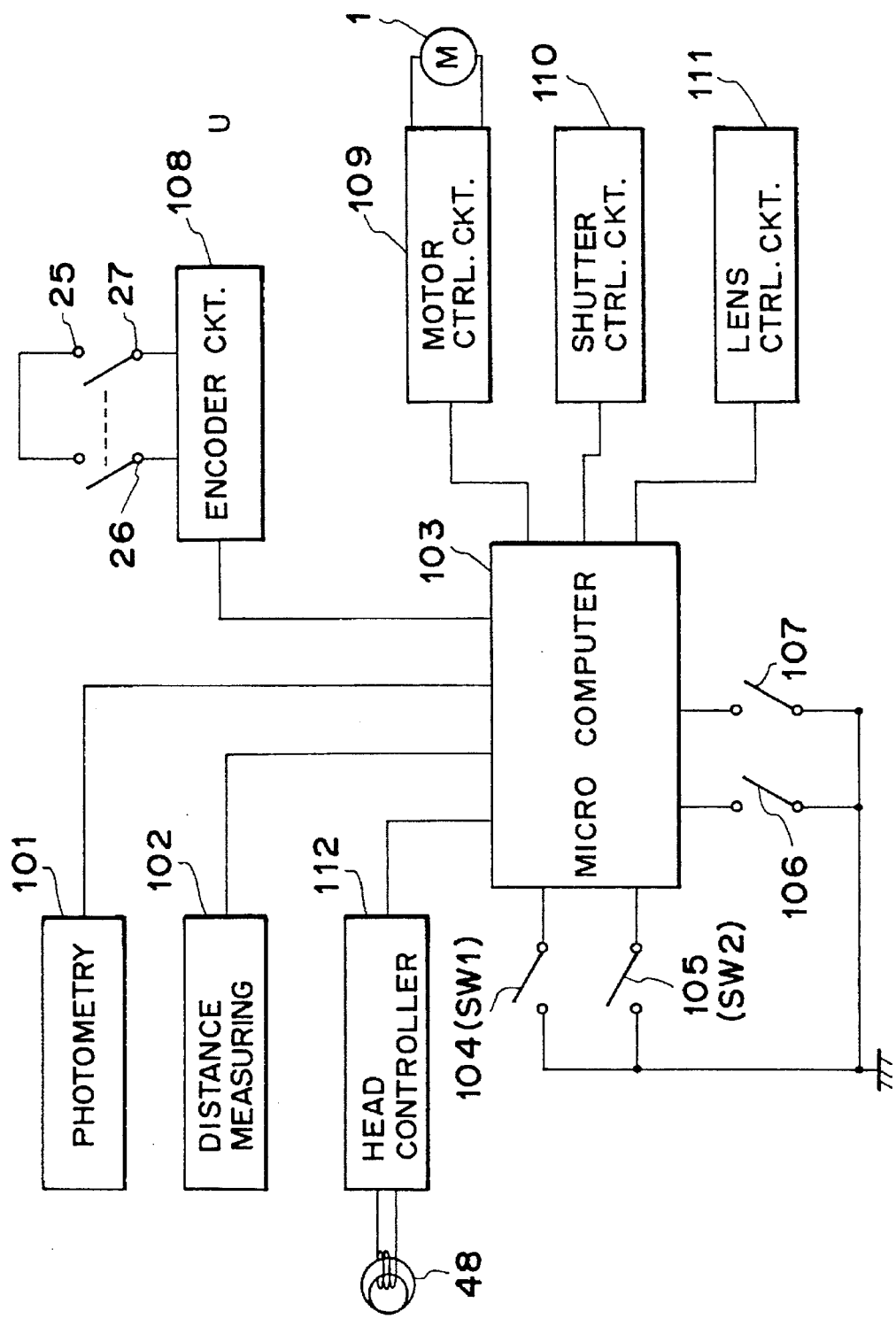
FIG. 5 is a block diagram showing an electrical circuit of the camera according to the preferred embodiments of the present invention.

FIG. 5 is a block diagram of the basic electrical circuit in the preferred embodiments of the present invention.

Referring to FIG. 5, a photometry means 101 photometrically measures the brightness of an object to be photographed. A distance measuring means 102 measures the distance to an object when a focusing operation of a photographing lens is performed. A microcomputer 103 controls the operations of various circuits. A switch 104 is turned on in response to the first stroke of a release button (not shown) of the camera, and will be referred to as a switch SW1 hereinafter. A switch 105 is turned on in response to the second stroke of the release button, and will be referred to as a release switch SW2 hereinafter. A back lid switch 106 is turned on/off in response to opening/closing operations of a back lid. A cartridge switch 107 is turned on/off depending on whether or not the cartridge 33 is loaded in the cartridge chamber 35.

An encoder circuit 108 detects pulse signals generated by the pulse plate 25 and the segments 26 and 27 shown in FIG. 1, and the like, and the detected pulse signals are used as information for obtaining the rotation speed, the rotation amount (the feed amount of the film 34), and the like of the roller member 22. A motor control circuit 109 performs rotation control of the film driving motor 1. As described above, when the motor 1 is rotated in the normal direction (in the direction of the arrow B in FIG. 2), the film winding operation is performed; when it is rotated in the reverse direction (in the direction of the arrow C in FIG. 3), the film rewinding operation is performed. A shutter control circuit 110 controls exposure to the film. A lens control circuit 111 controls a lens barrel to focus an object on the basis of information from the distance measuring means 102. A head controller 112 performs read/write control of information from/to the magnetic storage portion (not shown) of the film 34 using the magnetic head 48 shown in FIG. 1, and the like.

Figure 6:
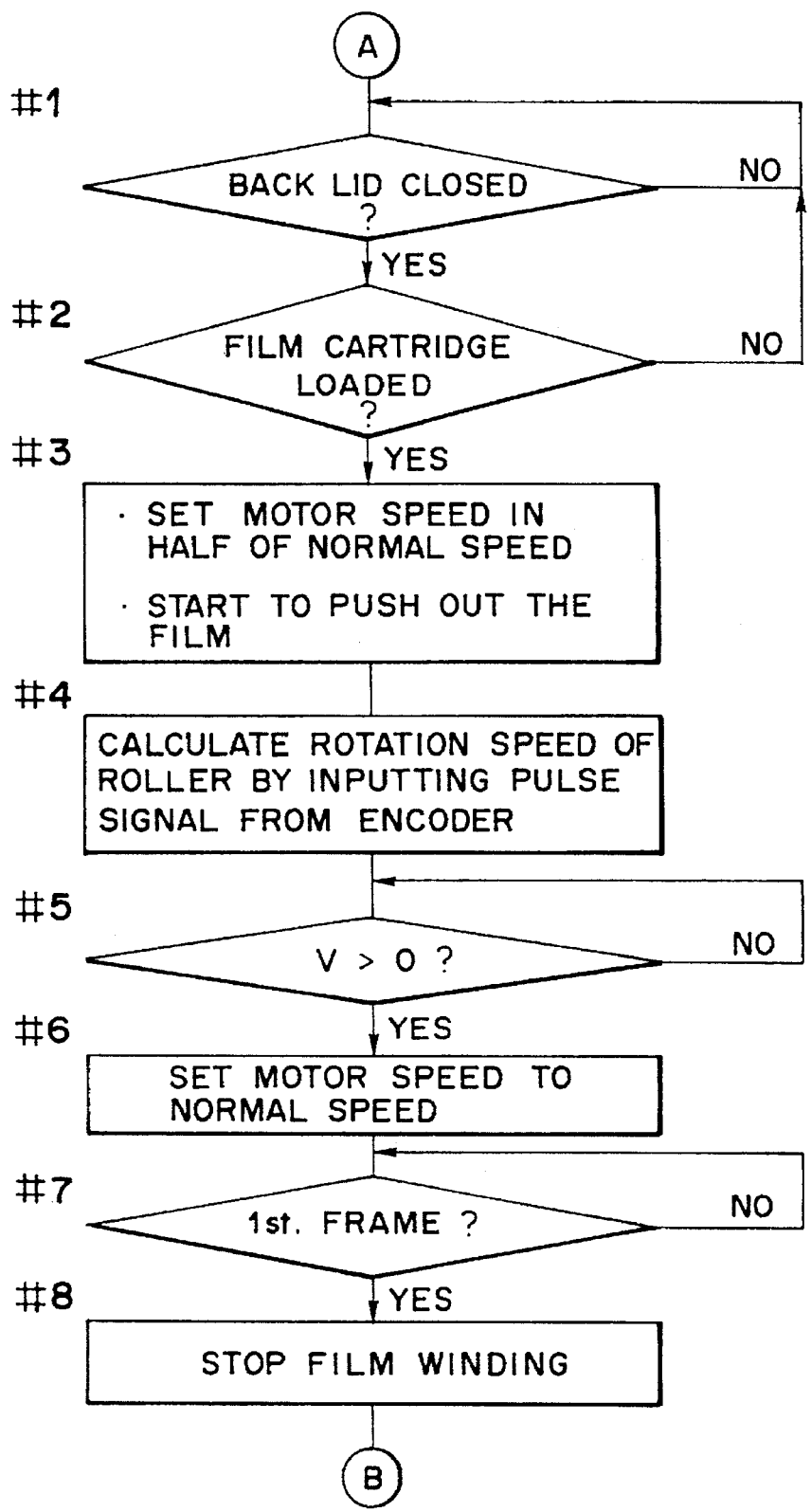
FIG. 6 is a flow chart showing some operations of a microcomputer shown in FIG. 5 according to the first embodiment of the present invention.
Figure 7:
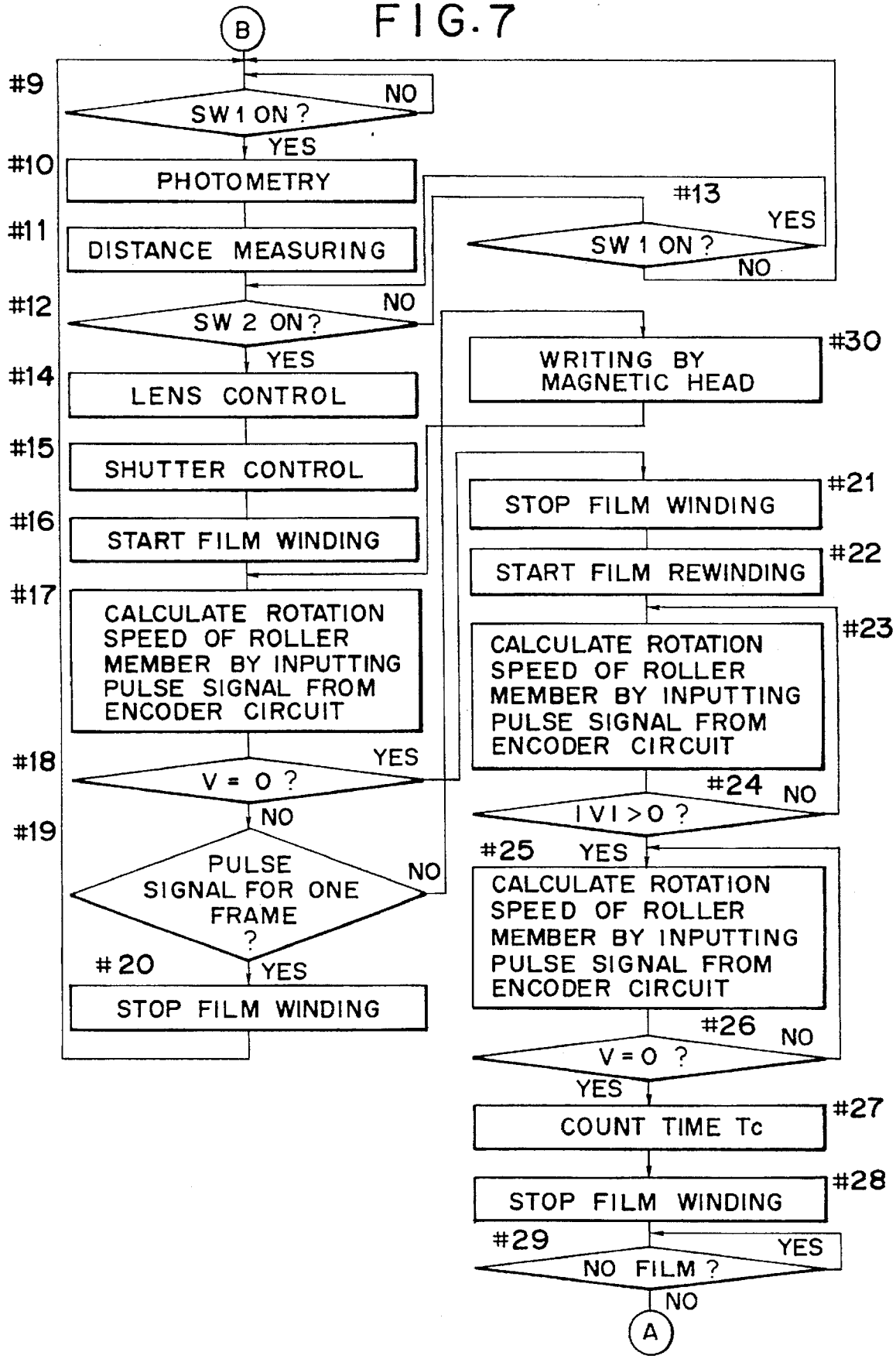
FIG. 7 is a flow chart showing operations continued from those shown in FIG. 6.

FIGS. 6 and 7 are flow charts showing the operation of the microcomputer 103. The operation will be described below with reference to FIGS. 6 and 7.

"Step 1" It is checked based on the state of the back lid switch 106 if the back lid of the camera is closed. If YES in step 1, the flow advances to step 2.

"Step 2" It is checked based on the state of the cartridge switch 107 if the film cartridge 33 is loaded in the cartridge chamber 35. If YES in step 2, the flow advances to step 3.

"Step 3" Since the film cartridge 33 is loaded, a winding start signal is sent to the motor control circuit 109 in step 3. In response to this signal, the film driving motor 1 is rotated in the direction of the arrow B, as shown in FIG. 2, and the thrust operation of the film 34 from the film cartridge 33 is started through the above-mentioned gear train. As described above, in this case, the speed of the film driving motor 1 is decreased through the motor control circuit 109 so as to slowly perform a film feeding operation (a detailed description of this operation will be made later).

"Step 4" Pulse signals (obtained by contact between the pulse plate 25 and the segments 26 and 27) corresponding to revolutions of the roller member 22 are input from the encoder circuit 108, and a calculation with an internal clock signal is performed, thereby obtaining a rotation speed v and an acceleration (dv/dt) of the roller member 22.

If a predetermined count value of the pulse signal within a predetermined period of time is represented by N, the following relations are satisfied:

$$v \propto N, (dv/dt) \propto (dN/dt)$$

If a generation time interval between adjacent pulse signals is represented by T, the following relations are satisfied:

$$v \propto (1/T), (dv/dt) \propto \{d(1/T)/dt\}$$

Therefore, in this embodiment, v and (dv/dt) are obtained by a calculation based on the count value N within the predetermined period of time, or by a calculation based upon detection of the generation time interval T of the pulse signals.

"Step 5" The encoder circuit 108 detects the rotation speed v (obtained by the above calculation) of the roller member 22 upon movement of the film, and if the encoder circuit detects it (v>0), the flow advances to step 6.

"Step 6" The speed of the film driving motor 1 is increased through the film control circuit 109 (a detailed description of this operation will be made later).

"Step 7" It is checked if the feeding operation of the first frame of the film 34 is completed. If YES in step 7, the flow advances to step 8.

"Step 8" The driving operation of the film driving motor 1 is stopped through the motor control circuit 109, thereby stopping the film winding operation.

"Step 9" It is checked if the release button is depressed to its first stroke to turn on the switch SW1. If YES in step 9, the flow advances to step 10.

"Step 10" The photometry means 101 is driven to measure the brightness of an object (to obtain photometry information).

"Step 11" The distance measuring means 102 is driven to calculate distance information (distance measuring information) to an object.

"Step 12" It is checked if the release button is depressed to its second stroke to turn on the release switch SW2. If YES in step 12, the flow advances to step 14; otherwise, the flow advances to step 13.

"Step 13" It is checked like in step 9 if the switch SW1 is ON. If NO in step 13, the flow returns to step 9; otherwise, the flow returns to step 12 to wait until the release switch SW2 is turned on.

"Step 14" The lens control circuit 111 is driven on the basis of the distance-measuring information obtained in step 11, thereby moving the photographing lens to an in-focus position.

"Step 15" The shutter control circuit 110 is driven on the basis of the photometry information obtained in step 10, thereby performing exposure control to the film 34.

"Step 16" The winding operation of the film 34 is started through the motor control circuit 109 and the film driving motor 1 so as to locate the next frame to oppose an aperture portion.

"Step 17" Pulse signals are received from the encoder circuit 108, and the rotation speed v and the rotation amount (the feed amount of the film) of the roller member 22 are calculated.

"Step 18" It is checked if the rotation speed of the roller member 22 obtained in step 17 is almost "0". If NO in step 18, i.e., if the film winding operation is being executed, the flow advances to step 19.

"Step 19" It is checked if the count content of the encoder circuit 108 has reached a one-frame feed amount of the film. If NO in step 19, the flow advances to step 30.

"Step 30" Information is written in the magnetic storage portion of the film 34, which is being fed, according to the write frequency by the magnetic head 48 through the head controller 112.

If it is determined in step 19 that the count content of the encoder circuit 108 has reached the one-frame feed amount of the film, the flow advances to step 20.

"Step 20" The driving operation of the film driving motor 1 is stopped through the motor control circuit 109, thereby stopping the winding operation of the film. The flow returns to step 9 to prepare for the next photographing operation.

If it is determined in step 18 that the rotation speed of the roller member 22 is almost "0", it is determined that the film 34 is finished and kept tense, i.e., it is determined that the photographing operations of all the frames are completed, and the flow advances to step 21.

"Step 21" The driving operation of the film driving motor 1 is stopped through the motor control circuit 109, thereby stopping the winding operation of the film.

"Step 22" In order to start a film rewinding operation (winding the film into the film cartridge 33), the film driving motor 1 is driven in the direction of the arrow C in FIG. 3 through the motor control circuit 109.

"Step 23" Pulse signals are input from the encoder circuit 108, thereby calculating the rotation speed v of the roller member 22.

"Step 24" It is checked if the absolute value of the rotation speed v of the roller member 22 obtained in step 23 is larger than "0". If it is determined that the absolute value is almost "0", the flow returns to step 23, and the rotation speed v of the roller member 22 is calculated again. Thereafter, if it is determined that the absolute value becomes larger than "0", i.e., if the rotation of the roller member 22 is detected, the flow advances to step 25.

The reason why the decision flow in step 24 is provided is as follows. That is, when the film 34 is loosely wound around the film take-up spool 7 at the beginning of the rewinding operation, transmission of the movement of the film 34 to the roller member 22 is delayed. For this reason, step 24 is provided so as not to erroneously determine the end of the film rewinding operation.

"Step 25" Pulse signals are input from the encoder circuit 108, thereby calculating the rotation speed v of the roller member 22.

"Step 26" It is checked if the rotation speed v of the roller member 22 obtained in step 25 is "0". If NO in step 26, the flow returns to step 25, and the same operation is repeated until the speed v becomes "0" If it is determined that the rotation speed v of the roller member 22 becomes "0", i.e., that the rotation of the roller member 22 is stopped, it is determined that the tip end of the film has passed the position of the roller member 22, and the flow advances to step 27.

"Step 27" A timer for counting a predetermined period of time tc is started.

"Step 28" If it is determined that the predetermined period of time tc has elapsed, the film rewinding operation is stopped.

"Step 29" It is checked based on the state of the cartridge switch 107 if the film cartridge 33 is unloaded from the cartridge chamber 35. If YES in step 29, the flow returns to step 1 shown in FIG. 1.

Figure 8:
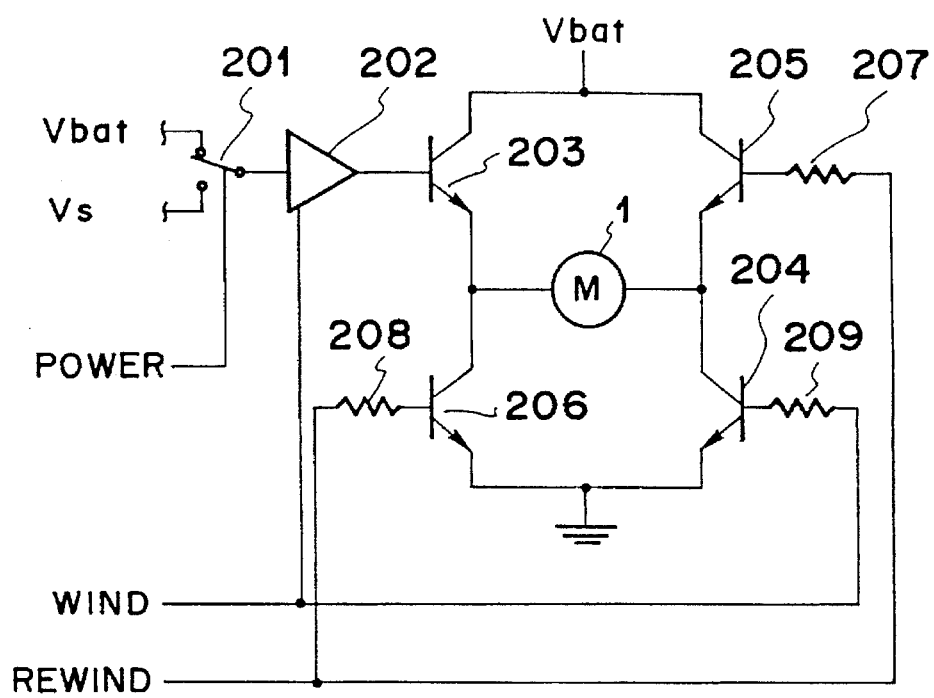
FIG. 8 is a circuit diagram showing an example of rotation speed control of a film driving motor according to the first embodiment of the present invention.

Rotation speed control of the film driving motor 1 executed in steps 3 and 6 will be described below with reference to FIG. 8.

A switch 201 is used for selecting a voltage to be applied to the film driving motor 1 so as to control the driving force of the film driving motor 1. That is, the switch 201 is used for selecting whether a reference voltage Vs or a power supply voltage Vbat (>Vs) is applied to an amplifier 202. The switching operation of the switch 201 is controlled by a signal POWER. More specifically, when the rotation speed of the film driving motor 1 is saved to a rotation speed half a normal speed like in step 3 in FIG. 6, the switch 201 is switched to the reference voltage Vs side by the signal POWER. When the film driving motor 1 is set in a full power state like in step 6, the switch 201 is switched to the power supply voltage Vbat side by the signal POWER. Thereafter, when a film winding signal WIND is input, the amplifier 202 is enabled, and both transistors 203 and 204 are turned on. As a result, the film driving motor 1 is rotated at a normal rotation speed according to the switching control of the switch 201.

In the film rewinding operation, since the rotation speed of the film driving motor 1 need not be controlled, transistors 205 and 206 are directly driven by a film rewinding signal REWIND. Note that the circuit shown in FIG. 8 includes resistors 207 to 209.

Figure 9:
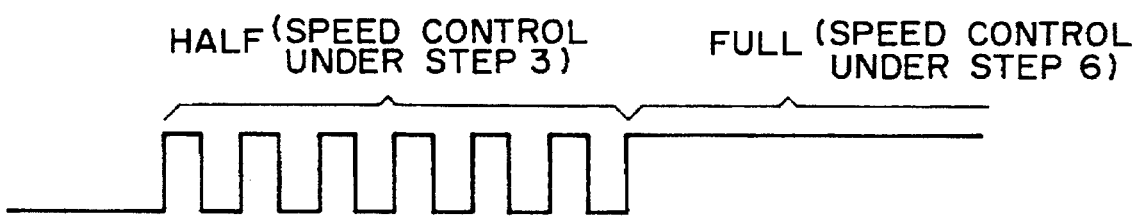
FIG. 9 is a chart for explaining another example of rotation speed control of the film driving motor according to the first embodiment of the present invention.

FIG. 9 is a chart for explaining another example of the rotation speed control method of the film driving motor 1. As can be understood from FIG. 9, energization to the film driving motor 1 is duty-driven, thereby allowing the same rotation speed control as above.

Figure 10:
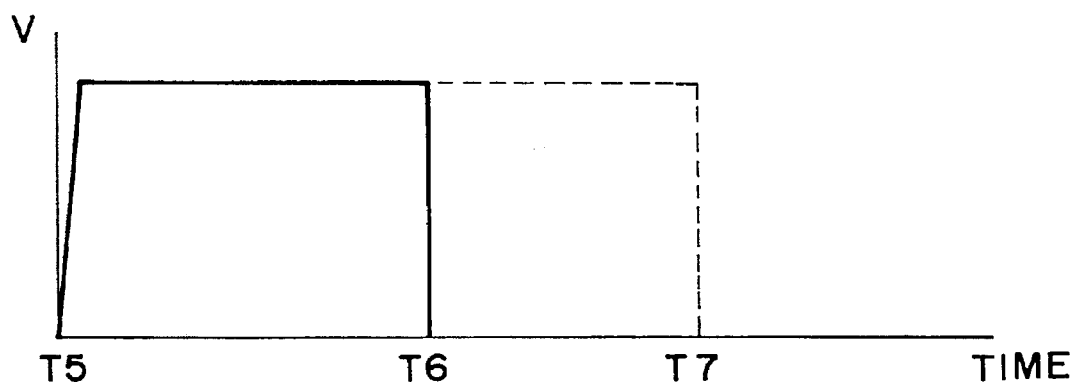
FIG. 10 is a graph showing the relationship between the feeding speed of the tip end of a film and the rotation speed of a roller member in a film rewinding operation of the film according to the first embodiment of the present invention.

FIG. 10 is a graph showing the rotation speed v (solid curve) of the roller member 22 in the film rewinding operation. FIG. 10 illustrates a state wherein the rewinding operation is started at a time T5, and the tip end of the film passes the position of the roller member 22 at a time T6. In the film rewinding direction, the roller member 22 is immediately stopped since a frictional force with the opposing surface is strong. A broken curve represents the feeding speed of the tip end of the film. A time interval between times T6 and T7 corresponds to the predetermined period of time tc in step 27 in FIG. 7.

Figure 11:
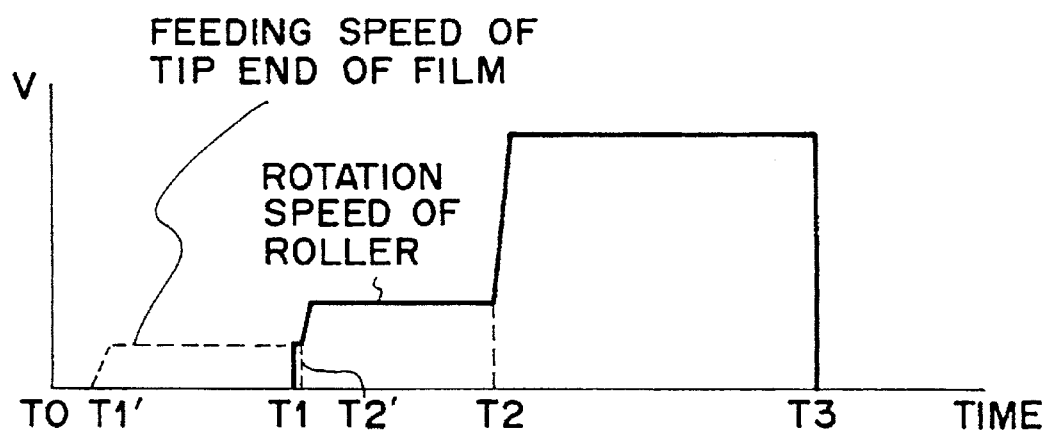
FIG. 11 is a graph showing the relationship between the feeding speed of the tip end of the film and the rotation speed of the roller member in a film winding operation of the film according to the first embodiment of the present invention.

FIG. 11 is a graph showing the speeds of the roller member 22 and the tip end of the film under an assumption of the arrangement of this embodiment.

The tip end of the film begins to move after a delay time T1' from the beginning of a film winding (thrust) operation at a time T0. When the tip end of the film reaches the position of the roller member 22 at time T1 after the thrust operation is started, the rotation speed v of the roller member 22 is detected (corresponding to step 5 in FIG. 6). At a time T2', the rotation speed of the film driving motor 1 is increased, and the film speed is increased (corresponding to step 6 in FIG. 6). When the film 34 is wound around the film take-up spool 7 at a time T2, the rotation speed v is also increased. Step 8 in FIG. 6 corresponds to a time T3.

Figure 12:
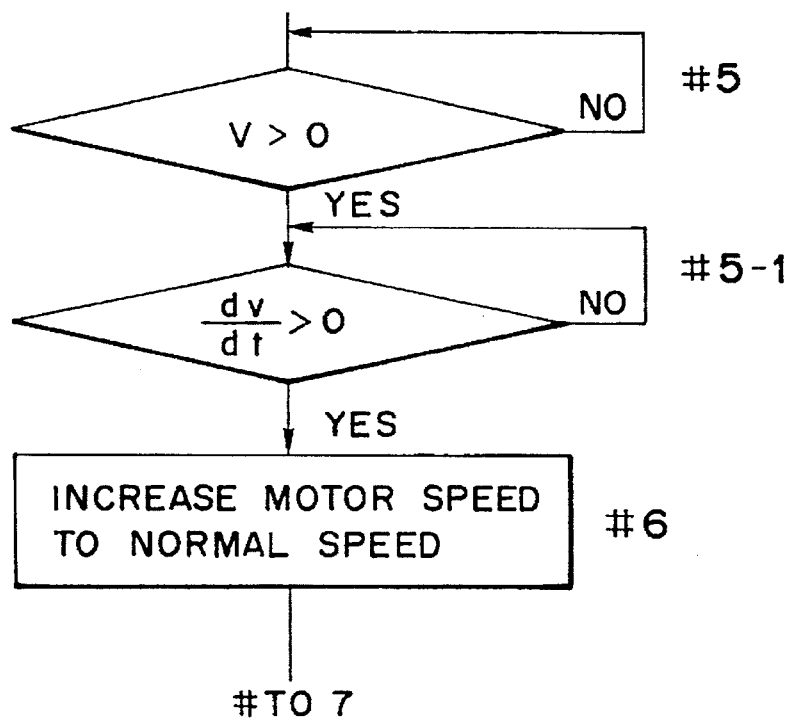
FIG. 12 is a flow chart showing principal operations of the microcomputer shown in FIG. 5 according to the second embodiment of the present invention.

FIG. 12 is a flow chart showing only principal part of the second embodiment of the present invention.

In this embodiment, decision step 5-1 "(dv/dt)>0" is inserted between steps 5 and 6 shown in FIG. 6. In this step, it is checked if the rotation acceleration of the roller member 22 changes radically. If YES in step 5-1, it is determined that the film 34 is wound around the film take-up spool 7, and the flow advances to step 6.

Figure 13:
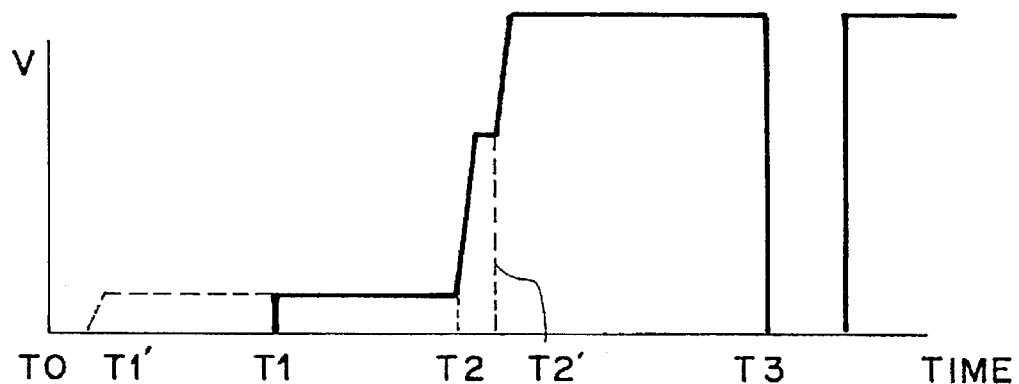
FIG. 13 is a graph showing the relationship between the feeding speed of the tip end of a film and the rotation speed of a roller member in a film winding operation of the film according to the second embodiment of the present invention.

FIG. 13 shows this state. After a time T2 is detected, the rotation speed of the film driving motor 1 is increased at a time T2", and the feeding speed of the film 34 is increased.

The reason why it is determined based on an abrupt change in rotation acceleration of the roller member 22 that the film 34 is taken up by the film take-up spool 7 will be explained below with reference to FIG. 13.

In FIG. 13, after the film cartridge 33 is loaded, the film winding (thrust) operation is started at a time T0. A solid curve represents the rotation speed of the roller member 22, and broken curves the feeding speed of the tip end of the film in the thrust operation by driving the fork. Although the speeds slightly oscillate due to a variation in load in practice, such oscillation is omitted from FIG. 13 since it can be ignored as a whole.

A time interval between times T0 and T1 corresponds to a film thrust period, and a delay time (T1') is generated to absorb a loose winding state of the film 34 in the film cartridge 33 until the movement is started. A time interval between times T1' and T1 corresponds to an actual thrust period of the film 34 by the fork 20. The rotation speed of the fork 20 determines the film feeding speed during this period. During this interval, the roller member 22 is not rotated since the film 34 does not move the roller member 22.

At the time T1, the tip end of the film reaches the roller member 22. Thereafter, the rotation speed of the roller member 22 is detected due to the film 34 moved by the thrust operation by the fork 20 until the film 34 reaches the film take-up spool 7.

During a time interval between the time T1 and a time T2, the tip end of the film is fed to the film take-up spool 7, and at the time T2, the film 34 is wound around the film take-up spool 7. More specifically, an abrupt change in speed of the roller member 22 means that the film 34 is wound around the film take-up spool 7, and is rotated at a speed corresponding to that of the spool 7. Thereafter, the rotation speed of the film driving motor 1 is increased at a time T2", and the film 34 is wound up to a predetermined position (where the first frame reaches an aperture portion) according to the rotation speed of the film take-up spool 7 upon rotation of the motor 1.

When the first frame reaches the predetermined position, the film winding operation by the motor control circuit 109 is stopped, and the film take-up spool 7 is also stopped at a time T3. When a photographing operation to the first frame is ended, the winding operation of the film 34 is started toward the second frame from a time T4.

Figure 14:
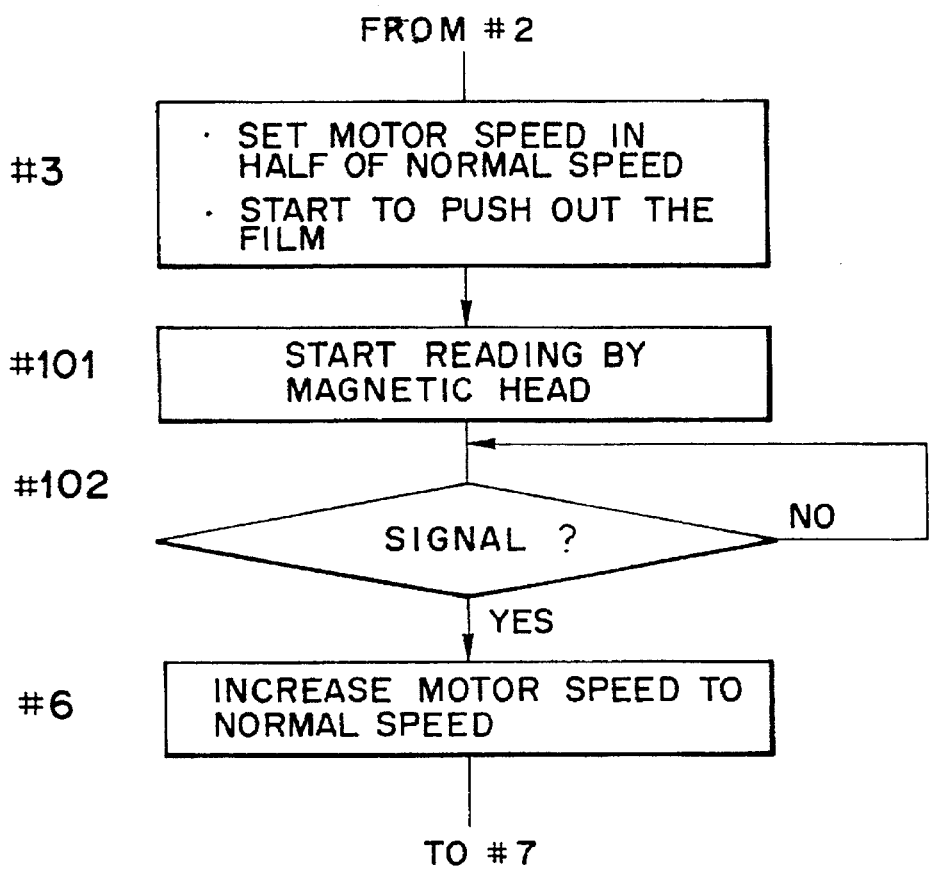
FIG. 14 is a flow chart showing principal operations of the microcomputer shown in FIG. 5 according to the third embodiment of the present invention.

FIG. 14 is a flow chart showing only an operation of principal part of the third embodiment of the present invention.

In this embodiment, information recorded on the film 34 is detected by the magnetic head 48, thereby increasing the rotation speed of the film driving motor 1 (setting the rotation speed to be a normal speed). For this purpose, in this embodiment, steps 101 and 102 are inserted in place of steps 4 and 5 in FIG. 6.

More specifically, in step 101, an information read operation by the magnetic head 48 is started. In step 102, it is checked if a readout signal is detected, i.e., if the tip end of a film has reached the position of the magnetic head 48. In step 6, the rotation speed of the film driving motor 1 is increased to a normal rotation speed.

Figure 15:
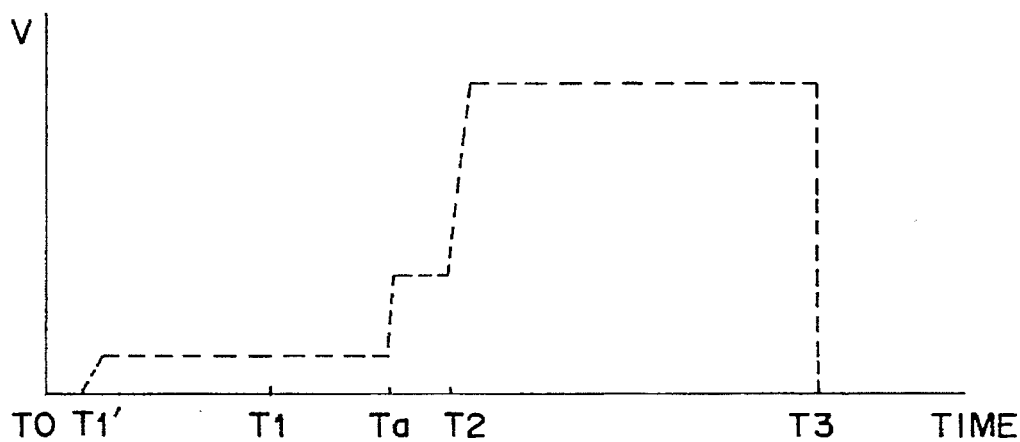
FIG. 15 is a graph showing the feeding speed of the tip end of a film in a film winding operation according to the third embodiment of the present invention.
Figure 16:
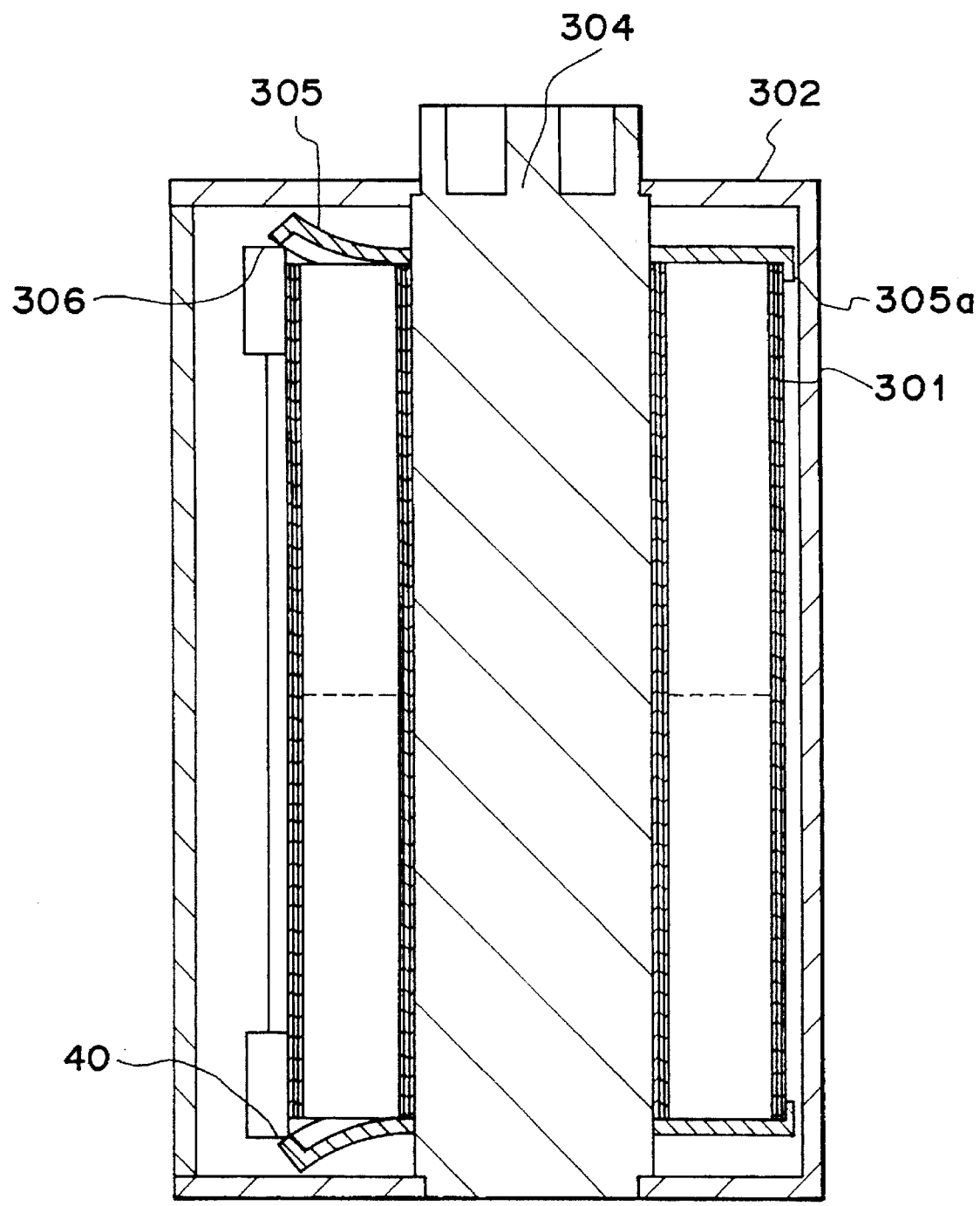
FIG. 16 is a longitudinal sectional view of a thrust type cartridge film used in the embodiments of the present invention.
Figure 17:
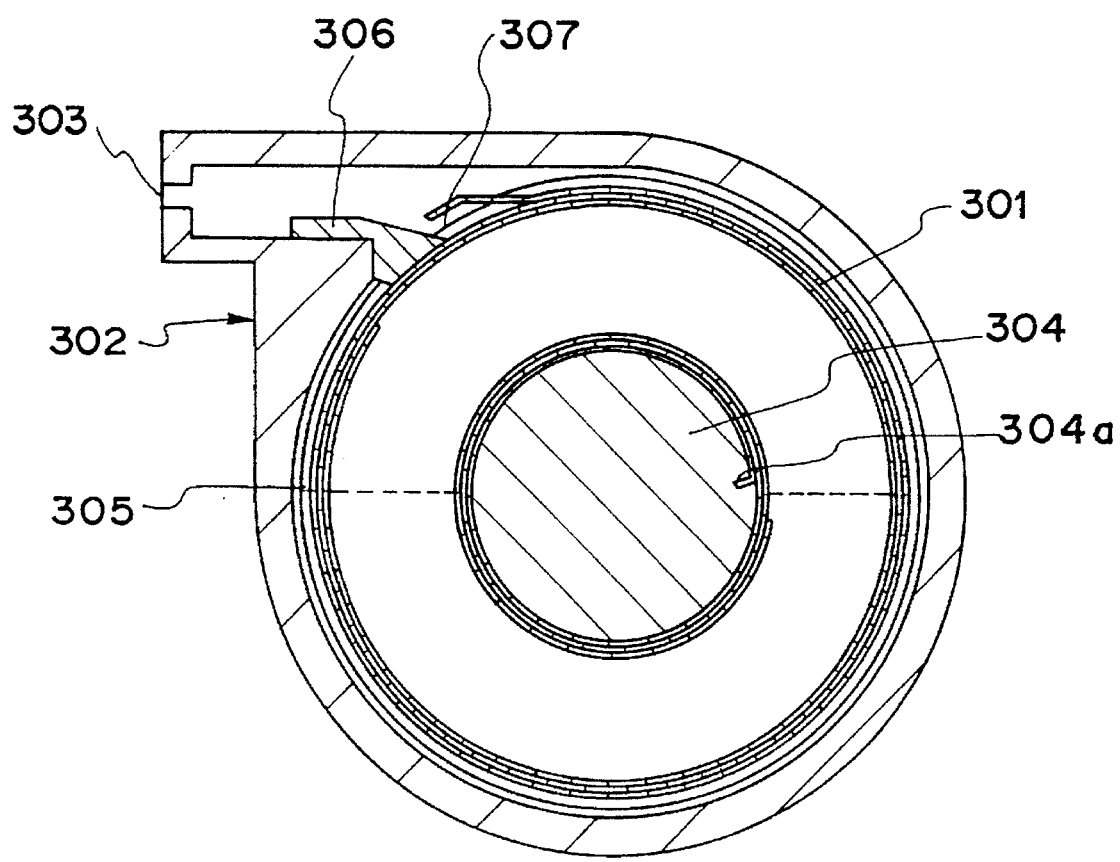
FIG. 17 is a cross-sectional view of the thrust type cartridge film used in the embodiments of the present invention.

FIG. 15 shows the feeding speed of the tip end of the film in the third embodiment. As can be seen from FIG. 15, a timing at which the rotation speed of the film driving motor 1 is increased to a normal rotation speed corresponds to a time Ta between times T1 and T2.

According to each of the above embodiments, in a camera using a thrust type film cartridge, whether or not the tip end of a film passes between the magnetic head 48 and the roller member 22 as a film urging member is determined by checking if the pulse signals are generated (first embodiment), or if the rotation acceleration of the roller member 22 abruptly changes (second embodiment), or if information recorded on the film 34 is read out by the magnetic head 48 (third embodiment). Until this determination is made, the rotation speed of the film driving motor 1 is controlled to be equal to or lower than a predetermined rotation speed. For this reason, the film 34 can enter and pass between the magnetic head and the film urging member, a film aperture portion of the camera, and a film passage slit of the film cartridge without buckling or being damaged, thus reliably winding the film. Note that the perforations of the film may be detected by a photoreflector to detect passage of the tip end of the film.

Since the above-mentioned effect can be obtained by controlling only the rotation speed of the film driving motor 1, no new driving source for moving the film urging member or the magnetic head in the direction of thickness of a film is needed, and hence, an increase in cost can be prevented. In addition, a circuit arrangement can be prevented from being complicated due to a complex timing of moving the film urging member or the magnetic head in the direction of thickness of the film.

Figure 18:
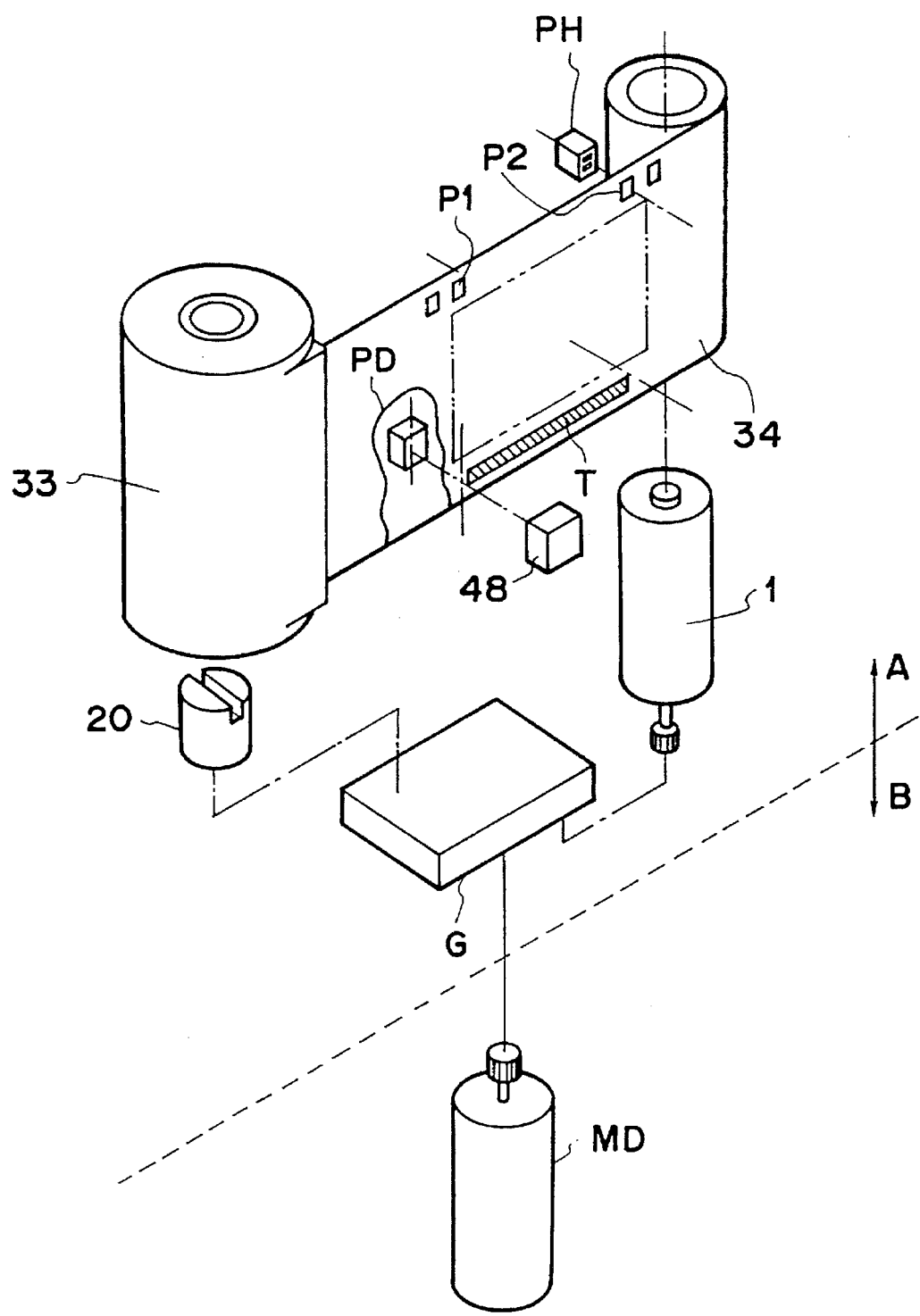
FIG. 18 is a perspective view showing the internal arrangement of principal part of a camera and a motor drive unit according to the fourth embodiment of the present invention.

FIG. 18 is a perspective view showing the internal arrangement of principal part of a camera, and the like according to the fourth embodiment of the present invention. In FIG. 18, an arrow A indicates a camera, and an arrow B indicates a motor drive unit.

In FIG. 18, the camera A includes a photoreflector PH for detecting perforations P1 and P2 of a film 34 (to be described later), and generating a signal for detecting one frame of the film 34, and an information write end timing signal, a film feed motor 1 arranged in a spool, a gear train G, having an arrangement shown in FIG. 1, for attaining a reduction gear operation, and switching a winding/rewinding direction, a rewinding fork 20, a thrust type film cartridge 33, the film 34 having a magnetic storage portion T at the base side, the perforations P1 and P2 arranged in correspondence with one photographing frame, and a magnetic head 48 for writing/reading out information in/from the magnetic storage portion T on the film 34. A pad PD is used for pressing the film 34 against the magnetic head 48, and has a central recess portion for assuring a tight-contact state between the film 34 and a head gap of the magnetic head 48.

The motor drive unit B includes a film feed motor MD, which has a larger power than that of the film feed motor 1, and meshes with the gear train G.

Figure 19:
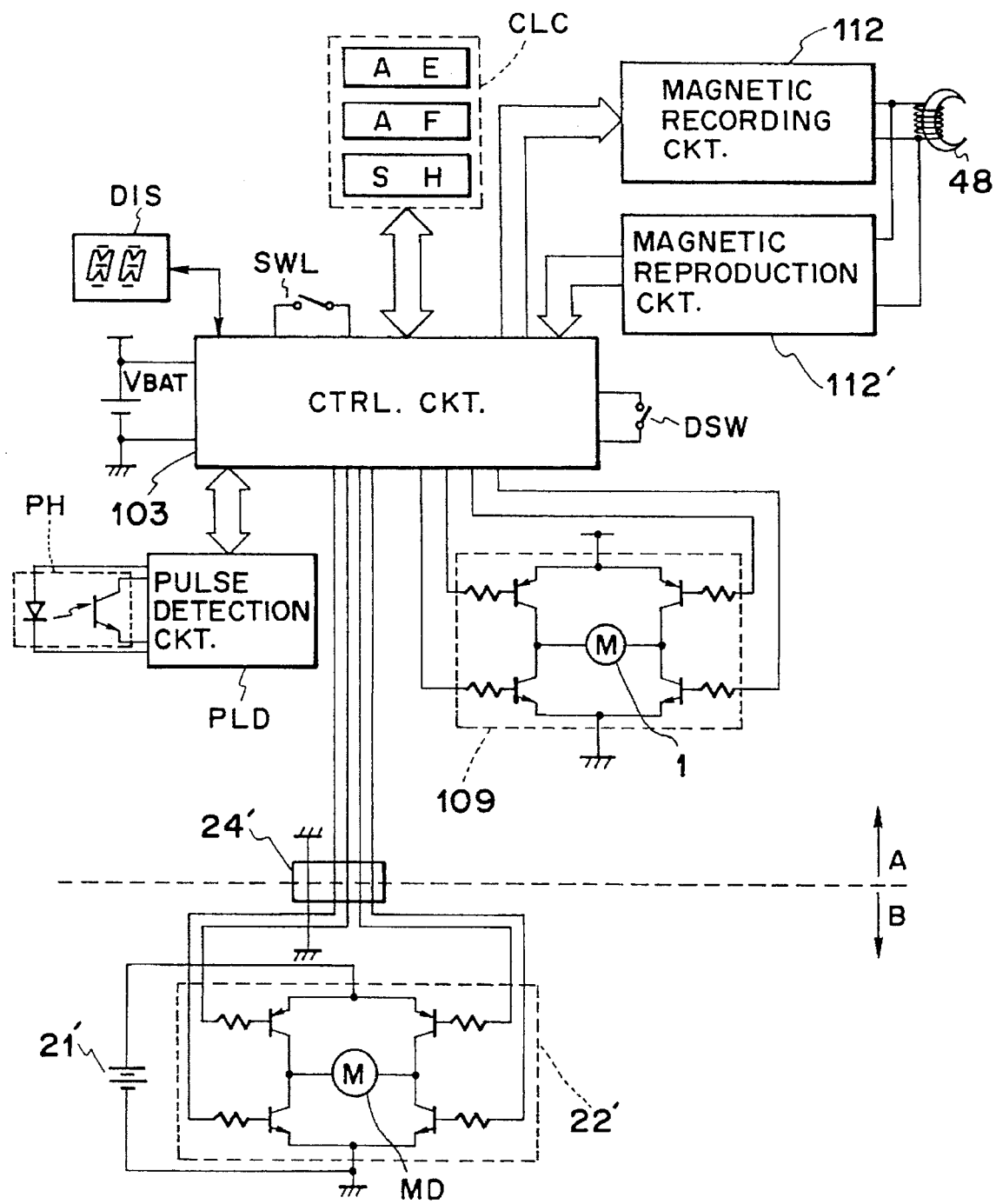
FIG. 19 is a circuit diagram showing electrical circuits of the camera and the motor drive unit shown in FIG. 18.

FIG. 19 is a block diagram showing a circuit arrangement of the camera A and the motor drive unit B.

In FIG. 19, the camera A includes a power supply battery VBAT for the camera, a control circuit 103, comprising, e.g., a microcomputer, for controlling various operations of the camera, a release switch SWL for initiating a photographing operation, a film feeding circuit 109 for driving the film feed motor 1 to wind and rewind the film 34, a pulse detection circuit PLD for converting a perforation signal from the photoreflector PH into a corresponding signal for the control circuit 103, a magnetic recording circuit 112 for driving the magnetic head 48 to record various pieces of information on the magnetic storage portion T of the film 34, a magnetic reproduction circuit 112' for amplifying an analog signal read out from the magnetic storage portion T of the film 34 by the magnetic head 48, and converting the analog signal into a digital Signal to obtain a corresponding signal for the control circuit 103, an AE·AF·SH circuit CLC for performing known photometry, distance measuring, and shutter control operations, a liquid crystal display DIS for displaying a photographing count of the film 34, and alarming an abnormality, and a switch DSW which is turned on when an external attachment is attached to the camera A.

The motor drive unit B includes a power supply battery 21' serving as a driving source for the film feed motor MD, and equipped in the motor drive unit B independently of the power supply battery VBAT of the camera A side, a film feeding circuit 22' for controlling a driving operation of the film feed motor MD, and a contact 24' for electrically connecting the camera A and the motor drive unit B.

Figure 20:
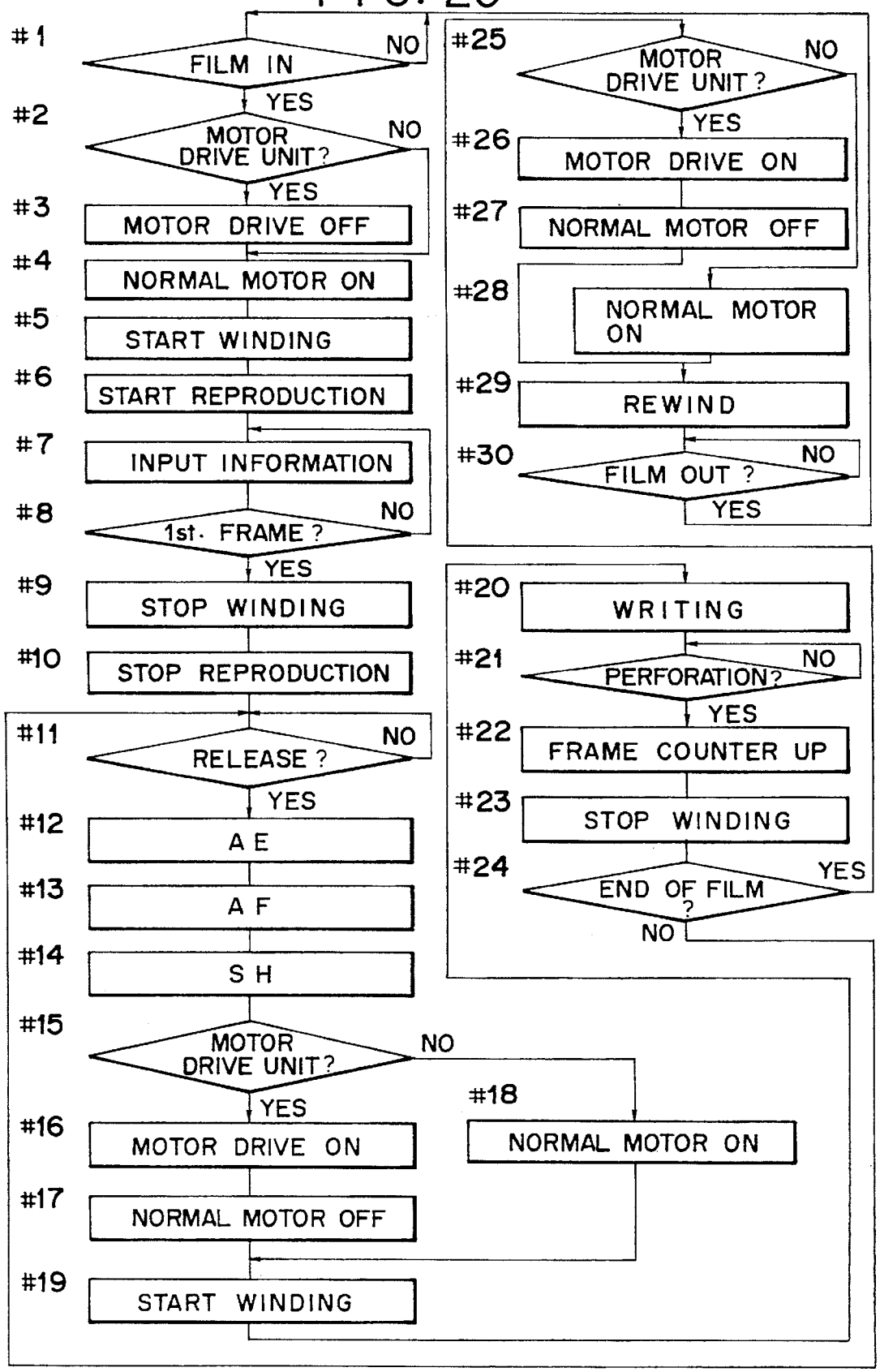
FIG. 20 is a flow chart showing an operation of a control circuit shown in FIG. 19.

FIG. 20 is a flow chart showing an operation of the control circuit 103. The operation will be explained below with reference to FIG. 20.

"Step 1" It is checked based on the state of a film switch (not shown) if the film cartridge 33 is loaded. If YES in step 1, the flow advances to step 2.

"Step 2" It is checked based on the state of the switch DSW if the motor drive unit B is attached. If YES in step 2, the flow advances to step 3; otherwise, the flow advances to step 4.

"Step 3" Although the motor drive unit B for a high-speed feeding operation is attached, since the tip end of the film may buckle or may be damaged at the exit of the film cartridge 33 or by a film guide portion of the camera film 34, as feeding state of the film 34, as described above, the driving operations of the film feeding circuit 22' and the film feed motor MD of the motor drive unit B are disabled at this time.

"Step 4" The film feed motor 1 of the camera A side is set to be able to be driven by the film feeding circuit 109.

In this case, the film feed motor 1 is not rotated in practice, and a control signal from the control circuit 103 is input not to the film feeding circuit 22' of the motor drive unit B side but to the film feeding circuit 109 of the camera A side.

"Step 5" The film feed motor 1 is rotated in the normal direction through the film feeding circuit 109, thus starting a winding operation of the film 34.

"Step 6" The magnetic head 48 and the magnetic reproduction circuit 112' are driven to start reproduction of film information, a regulated frame count, and the like stored in advance in the magnetic storage portion T of the film 34, which is being wound.

"Step 7" The film information, the regulated frame count, and the like are read out from the reproduced signal, and are set in the camera.

"Step 8" A perforation signal from the photoreflector PH is detected through the pulse detection circuit PLD to check if the photographing count has reached the first frame. If NO in step 8, the flow returns to step 7; otherwise, the flow advances to step 9.

"Step 9" The driving operation of the film feed motor 1 is stopped through the film feeding circuit 109, thereby stopping the winding operation of the film 34.

"Step 10" The information reading operation by the magnetic head 48 and the magnetic reproduction circuit 112' is stopped.

"Step 11" It is checked if the release switch SWL is ON. If YES in step 11, the flow advances to step 12.

"Step 12" Object luminance information is obtained by the AE·AF·SH circuit CLC to determine a shutter opening/closing condition.

"Step 13" Object distance information is obtained by the AE·AF·SH circuit CLC to drive a lens barrel, thus focusing on an object.

"Step 14" The AE·AF·SH circuit CLC is driven to perform shutter opening/closing control, i.e., exposure control, under the shutter opening/closing condition obtained in step 12.

"Step 15" It is checked based on the state of the switch DSW like in step 2 if the motor drive unit B is attached. If YES in step 15, the flow advances to step 16; otherwise, the flow advances to step 18.

"Step 16" The film feed motor MD of the motor drive unit B side is set to be able to be driven by the film feeding circuit 22'.

In this case, the film feed motor MD is not rotated in practice, and a control signal from the control circuit 103 is input to the film feeding circuit 22' of the motor drive unit B side.

"Step 17" The film feeding circuit 109 and the film feed motor 1 normally built in the camera A are set in a disabled state.

The disabled state means that the two ends of the terminals of the film feed motor 1 are not connected to any circuit, and the motor 1 is idled. When the film feed motors 1 and MD are energized at the same time, one motor having a lower rotation speed undesirably becomes a load on the other motor.

"Step 18" Since the motor drive unit B is not attached, the film feed motor 1 is set to be able to be driven by the film feeding circuit 109 like in step 4.

"Step 19" The winding operation of a photographing frame is started by the film feeding circuit and the film feed motor selected in steps 15 to 18. Therefore, when the film feeding circuit 22' and the film feed motor MD are selected, the film 34 is fed at a high speed; when the film feeding circuit 109 and the film feed motor 1 are selected, the film 34 is fed at a normal speed.

"Step 20" The magnetic head 48 and the magnetic recording circuit 112 are driven to write a photographing date, a shutter speed, an aperture value, and the like into the photographing frame during the film feeding operation.

"Step 21" It is checked if a perforation signal for one frame is input from the photoreflector PH through the pulse detection circuit PLD. If YES in step 21, the flow advances to step 22.

"Step 22" A frame count displayed on the liquid crystal display DIS is incremented.

"Step 23" The winding operation of the film 34 performed by the selected film feeding circuit and film feed motor is stopped.

"Step 24" The regulated frame count information fetched in a means (not shown) for detecting the last film frame is compared with the current frame count. If it is determined in step 24 that the film is finished (no frame remains), the flow advances to step 25; otherwise, the flow returns to step 11.

"Step 25" It is checked based on the state of the switch DSW like in step 15 if the motor drive unit B is attached. If YES in step 25, the flow advances to step 26; otherwise, the flow advances to step 28.

"Step 26" The film feed motor MD of the motor drive unit B side is set to be able to be driven by the film feeding circuit 22'.

"Step 27" The film feeding circuit 109 and the film feed motor 1 normally built in the camera A are set in a disabled state.

"Step 28" Since the motor drive unit B is not attached, the film feed motor 1 is set to be able to be driven by the film feeding circuit 109 like instep 4.

"Step 29" The rewinding operation of the film 34 is performed by the film feeding circuit and the film feed motor selected in steps 25 to 28. Upon completion of the rewinding operation of the film 34, the driving operation of the film feeding system is stopped, and the flow advances to step 30.

The end of the film rewinding operation can be determined based on, e.g., a state wherein the perforations of the film 34 cannot be determined for a predetermined period of time.

"Step 30" It is checked based on the state of the film switch (not shown) if the film cartridge 33 is unloaded. If YES in step 30, the flow returns to step 1.

Figure 21:
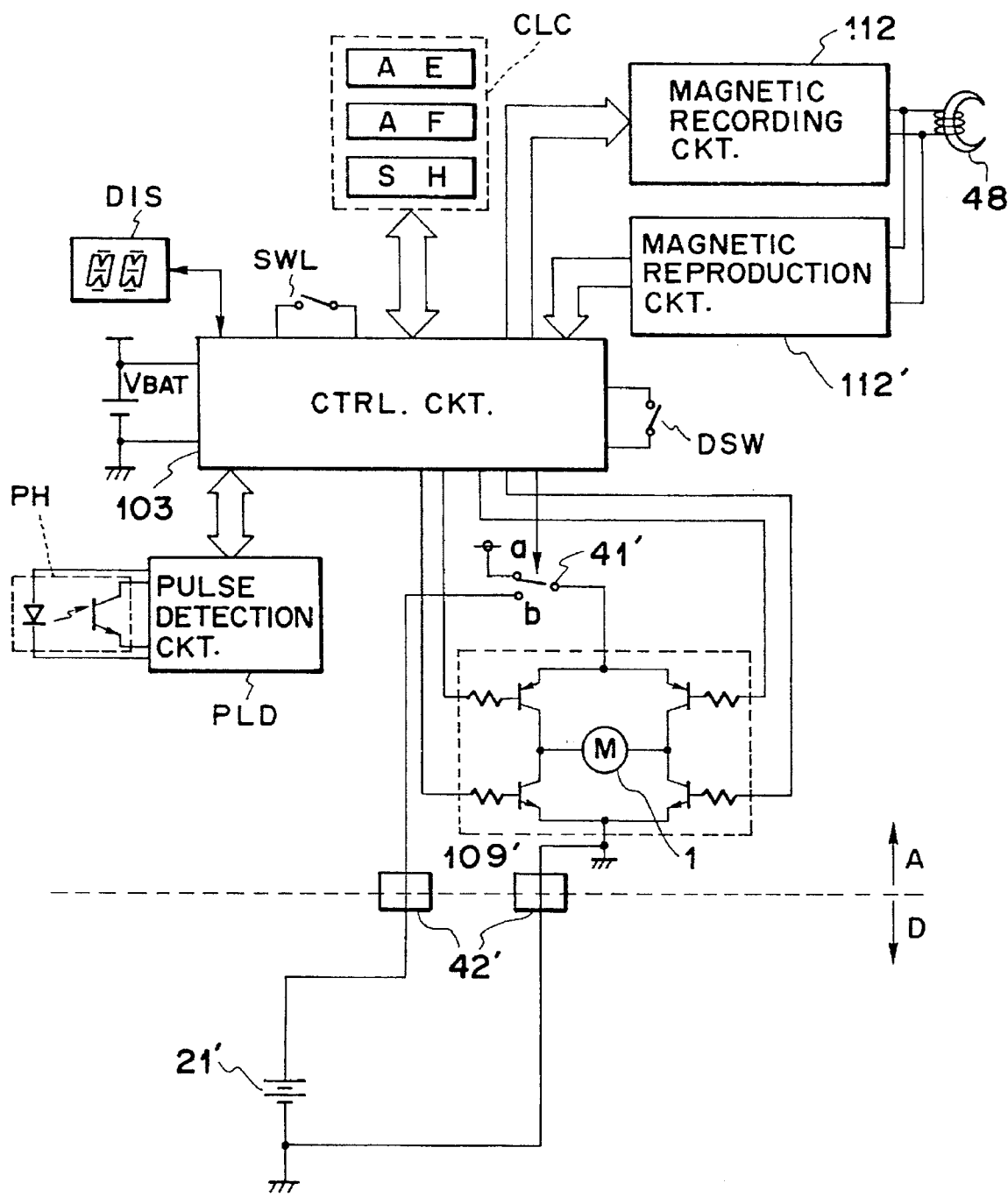
FIG. 21 is a circuit diagram showing electrical circuits of principal part of a camera and an external attachment according to the fifth embodiment of the present invention.

FIG. 21 is a circuit diagram showing the arrangements of a camera A and an external attachment D attached to the camera A according to the fifth embodiment of the present invention. The same reference numerals in FIG. 21 denote the same parts as in the fourth embodiment.

In this embodiment, an output from a high-voltage power supply battery 21' can be supplied as a booster voltage to a film feeding circuit 109 and a film feed motor 1 so as to attain a high-speed film feeding operation.

A switching means 41' is used for switching a power supply to be supplied to the film feeding circuit 109 (and the film feed motor 1). When the switching means 41' is switched to the contact a side, a power supply battery VBAT is connected as a power supply. In this case, the film feeding operation is performed at a normal speed. When the switching means 41' is switched to the contact b side, the booster power supply battery 21' of the external attachment D side, which battery can output a higher voltage than that of the power supply battery VBAT, is connected as a power supply. In this case, the film feeding operation can be performed at a high speed.

Contacts 42' are used for electrically connecting the external attachment D and the camera A.

Figure 22:
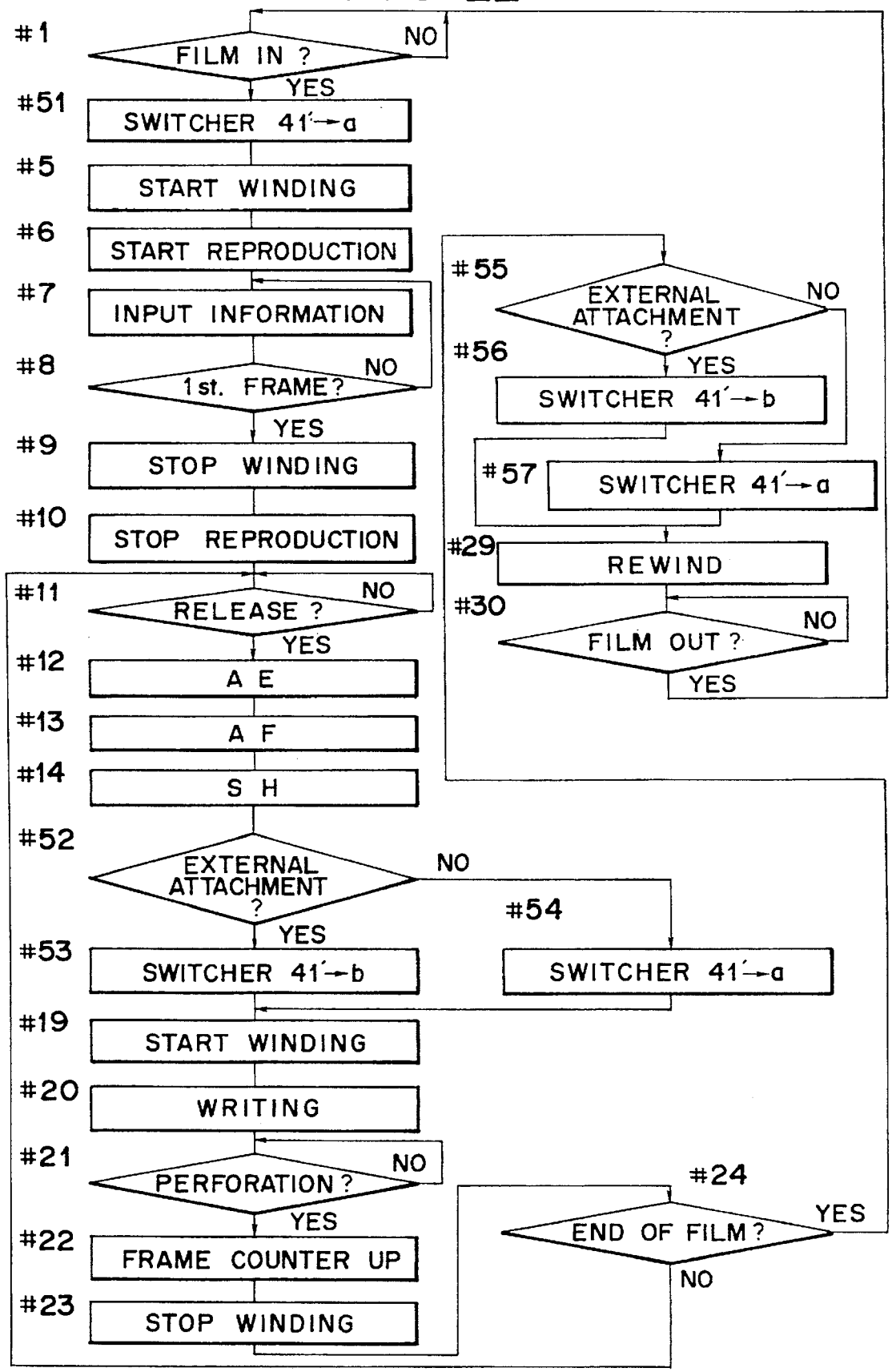
FIG. 22 is a flow chart showing an operation of a control circuit shown in FIG. 21.

FIG. 22 is a flow chart showing an operation of a control circuit shown in FIG. 21. The same step numbers in FIG. 22 denote the same steps as in the fourth embodiment, and only different steps will be described below.

If it is determined in step 1 that the film cartridge 33 is loaded, the flow advances to step 51, and the switching means 41' is switched to the contact a side to connect the film feeding circuit 109 to the power supply battery VBAT side. The flow then advances to step 5.

Upon completion of exposure control in step 14, the flow advances to step 52 to check based on the state of a switch DSW if the external attachment D is attached to the camera A. If YES in step 52, the flow advances to step 53, and the switching means 41' is switched to the contact b side to connect the film feeding circuit 109 to the power supply battery 21' side, thus allowing a high-speed feeding operation. On the other hand, if NO in step 52, the flow advances to step 54, and the switching means 41' is switched to the contact a side to connect the film feeding circuit 109 to the power supply battery VBAT side, thus allowing a normal film feeding operation.

Upon completion of the operation in step 53 or 54, the flow advances to step 19, and the winding operation of the film is started by the selected film feeding system.

If it is determined in step 24 that the film 34 is finished, the flow advances to step 55. In steps 55 to 57, the same operations as in steps 52 to 54 described above are performed. The flow then advances to step 29, and the rewinding operation of the film 34 is performed by the film feeding system selected in steps 55 to 57.

Figure 23:
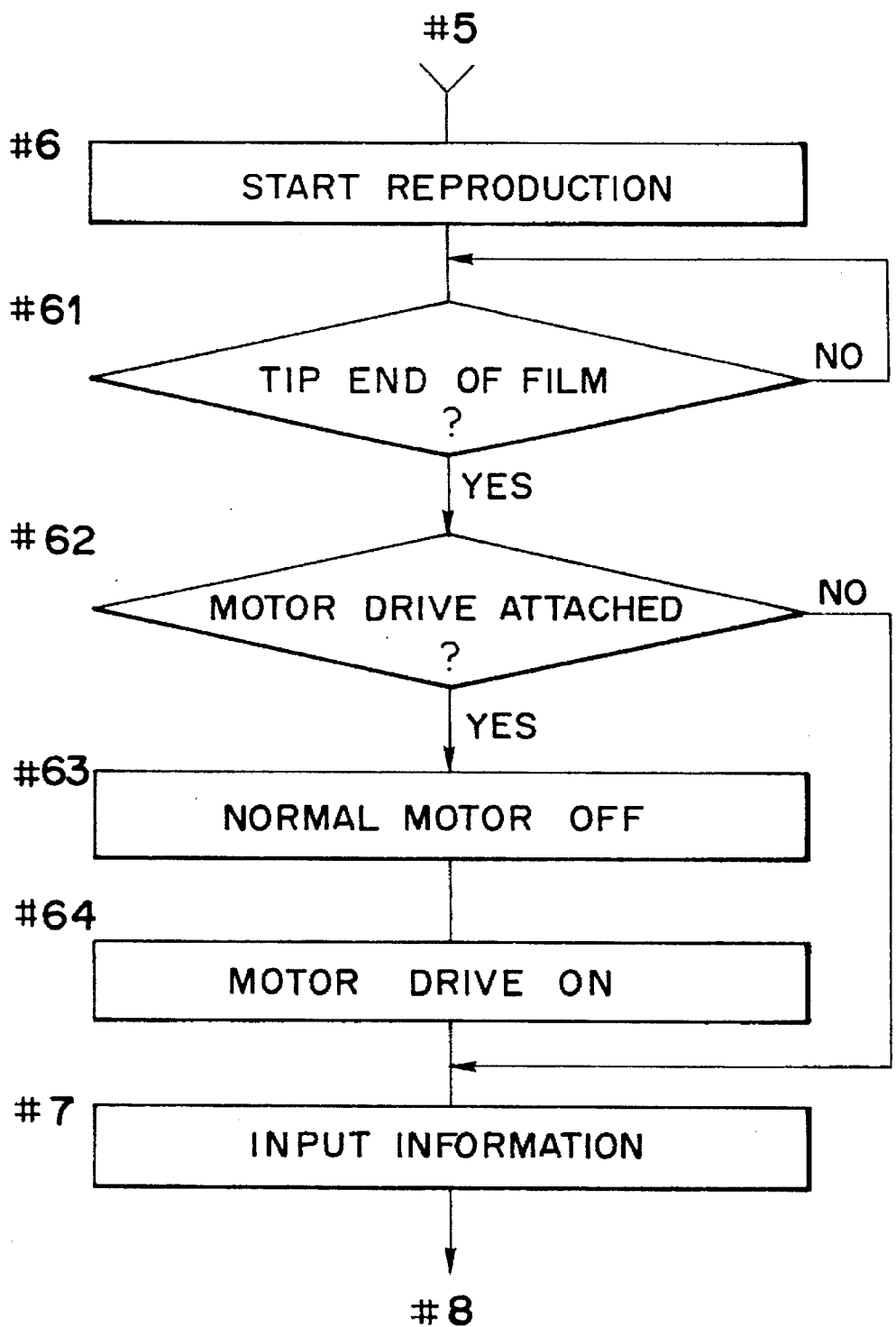
FIG. 23 is a flow chart showing an operation of principal part of a camera according to the sixth embodiment of the present invention.

FIG. 23 is a flow chart showing an operation of principal part of a camera according to the sixth embodiment of the present invention, and corresponds to a partial modification of the flow chart shown in FIG. 20. As a control circuit for this flow, one shown in FIG. 19 is used.

After the magnetic reproduction operation is started in step 6, the flow advances to step 61 to check, using the photoreflector PH and the pulse detection circuit PLD, if the tip end of the film passes the film guide portion in the camera A. If YES in step 61, the flow advances to step 62. In step 62, it is checked again, like in step 2, if the motor drive unit B is attached. If NO in step 62, the flow advances to step 7.

If it is determined in step 62 that the motor drive unit B is attached, the flow advances to step 63, and the film feeding circuit 109 and the film feed motor 1 in the camera A are set in a disabled state. In step 64, the high-speed film feeding circuit 22' and the film feed motor MD are set in an enabled state, so that the film can be wound at a high speed after its tip end passes the film guide portion. The flow then advances to step 7.

More specifically, in the fourth embodiment shown in FIG. 20, an idle feeding operation of the film is performed at a normal speed up to the first frame. However, in the sixth embodiment, when the tip end of the film is thrusted from the film cartridge 33, and passes the film guide portion in the camera A, a high-speed feeding operation is started. For this reason, a film idle feeding operation can be ended within a short period of time.

According to each of the above embodiments, in a camera capable of attaching an external attachment for attaining a high-speed film feeding operation, even when the external attachment is used, the high-speed feeding operation by the external attachment is disabled, and the film feeding operation is performed at a normal speed from when the film thrust operation from the film cartridge is started until the tip end of the film passes a predetermined position (e.g., the position of the film guide portion) of the camera. For this reason, the tip end of the film can be prevented from buckling or being damaged in the film thrust operation.

Figure 24:
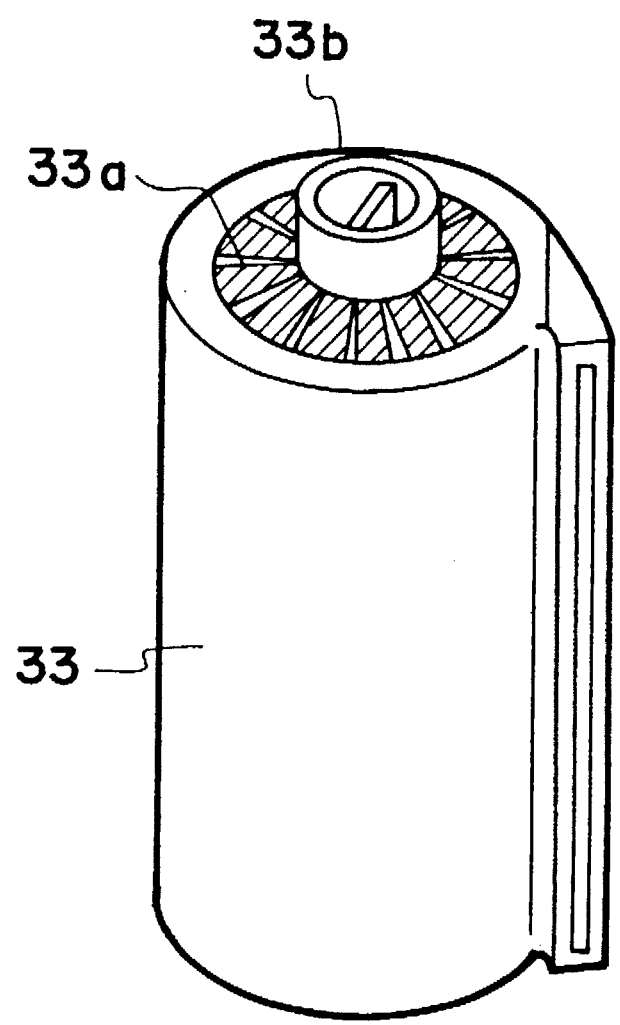
FIG. 24 is a perspective view showing a film cartridge used in the seventh embodiment of the present invention.

FIGS. 24 to 27 show the seventh embodiment of the present invention. FIG. 24 is a perspective view of a cartridge. A cartridge 33 is a thrust type cartridge, and has a film feed spool 33b, and a bar code disc 33a on which pieces of encoded or symbolic information associated with a film, for example, an ISO speed, a film frame count, a film type, and the like, are expressed by, e.g., bar codes, and which is rotated integrally with the film feed spool.

Figure 25:
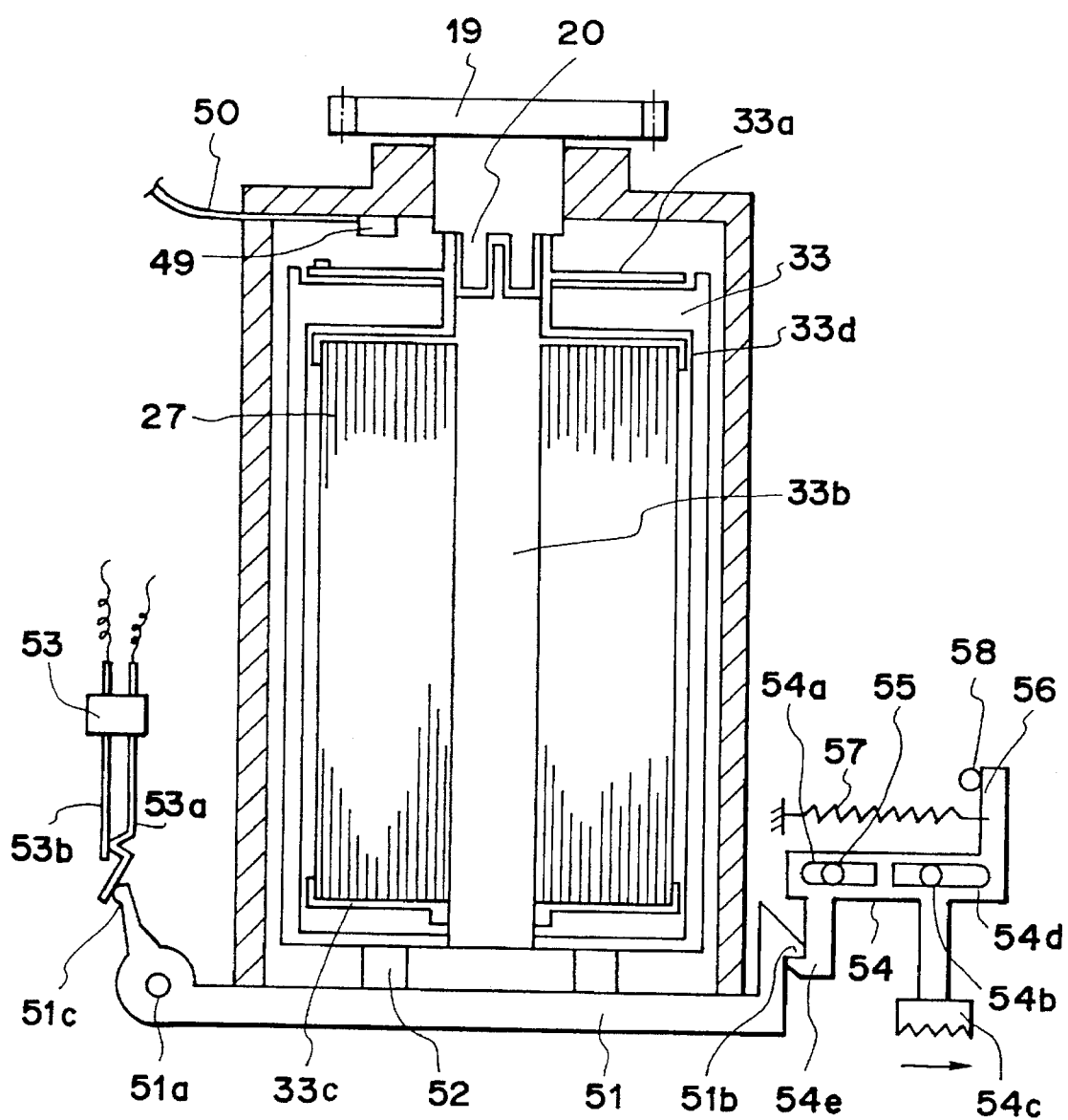
FIG. 25 is a longitudinal sectional view of a cartridge chamber in a film loading state shown in FIG. 24.

FIG. 25 is a longitudinal sectional view of a cartridge chamber portion in which a cartridge is loaded. Pressing members 33c and 33d are arranged in the cartridge chamber. A photoreflector 49 is used for optically reading out information written in the bar code disc 33a when the bar code disc 33a is rotated, and is attached to the inner wall of the cartridge chamber. The photoreflector 49 is mounted on a flexible printed circuit board 50, which is used for exchanging a signal for driving the photoreflector 49, and a signal read out by the photoreflector 49 with a control circuit (not shown). A cartridge lid 51 is mounted on a camera main body to be pivotal about a shaft 51a. A cartridge pressing member 52 is formed of an elastic member, and is fixed to the cartridge lid 51. When the cartridge lid 51 is closed, as shown in FIG. 25, the cartridge pressing member 52 presses the cartridge 33 upward to position it. A cartridge lid opening/closing switch 53 detects that the cartridge lid 51 is closed when segments 53a and 53b are electrically connected to each other. When the cartridge lid is closed, its portion 51c can contact the segment 53a. More specifically, when the cartridge lid is closed, the portion 51c contacts the segment 53a and brings it to be in contact with the segment 53b. When the cartridge lid is open, the segments 53a and 53b do not contact each other. A cartridge lid opening/closing lever 54 is slidably fitted on nibs 55 and 56 of a main body (not shown) through its elongated holes 54a and 54b. The lever 54 has a manual operation portion 54c. One end of a spring 57 is attached to the main body, and the other end thereof is attached to the cartridge lid opening/closing lever 54. The spring 57 biases the cartridge lid opening/closing lever 54 in a direction opposite to an arrow shown in FIG. 25. A stopper 58 is arranged on the main body (not shown), and regulates the left position of the cartridge lid opening/closing lever 54. A pawl portion 54e of the lever 54 can be engaged with a portion 51b of the lid 51. In a state shown in FIG. 25, the pawl portion 54e is engaged with the portion 51b, and holds the cartridge lid 51 at the closed position. As a gear train of a film feeding mechanism of the seventh embodiment, one shown in FIGS. 1 to 3 is used, and a film feeding operation is assumed to be performed, as described above.

FIG. 26 is a block diagram of an electrical circuit of the seventh embodiment. A control circuit 103 controls the operations of the overall camera, and incorporates a timer circuit. An AF·AE circuit CLC includes a means for measuring a distance to an object, and performs a focusing operation of a photographing lens (not shown), and a shutter opening/closing operation for controlling exposure to a film according to the brightness of an object. A magnetic head 48 is used for writing or reading out information to or from a magnetic recording portion of a film, and is driven by a magnetic head driving circuit 112. A film feed control circuit 109 controls rotation of a film driving motor as a driving source for feeding a film. A photoreflector control circuit 67 operates the photoreflector 49 to read out information associated with a film and written on the bar code disc 33a upon rotation of the bar code disc 33a. A switch 107 is turned on when the cartridge 33 is loaded in the cartridge chamber. A release switch SWL is manually turned on to start a release operation of the camera.

Figure 27:
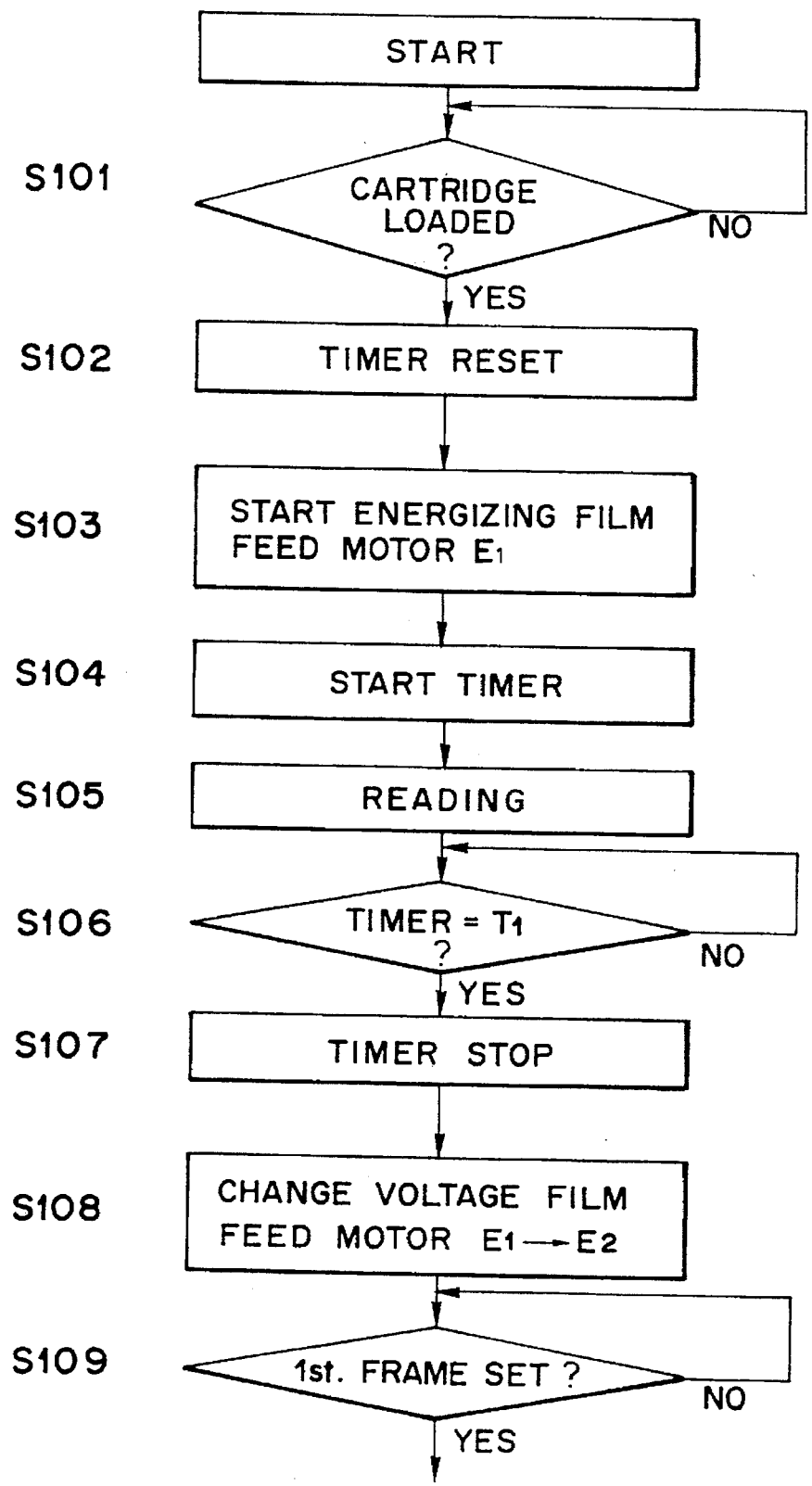
FIG. 27 is a flow chart showing an operation of a control circuit according to the seventh embodiment of the present invention.
Figure 28:
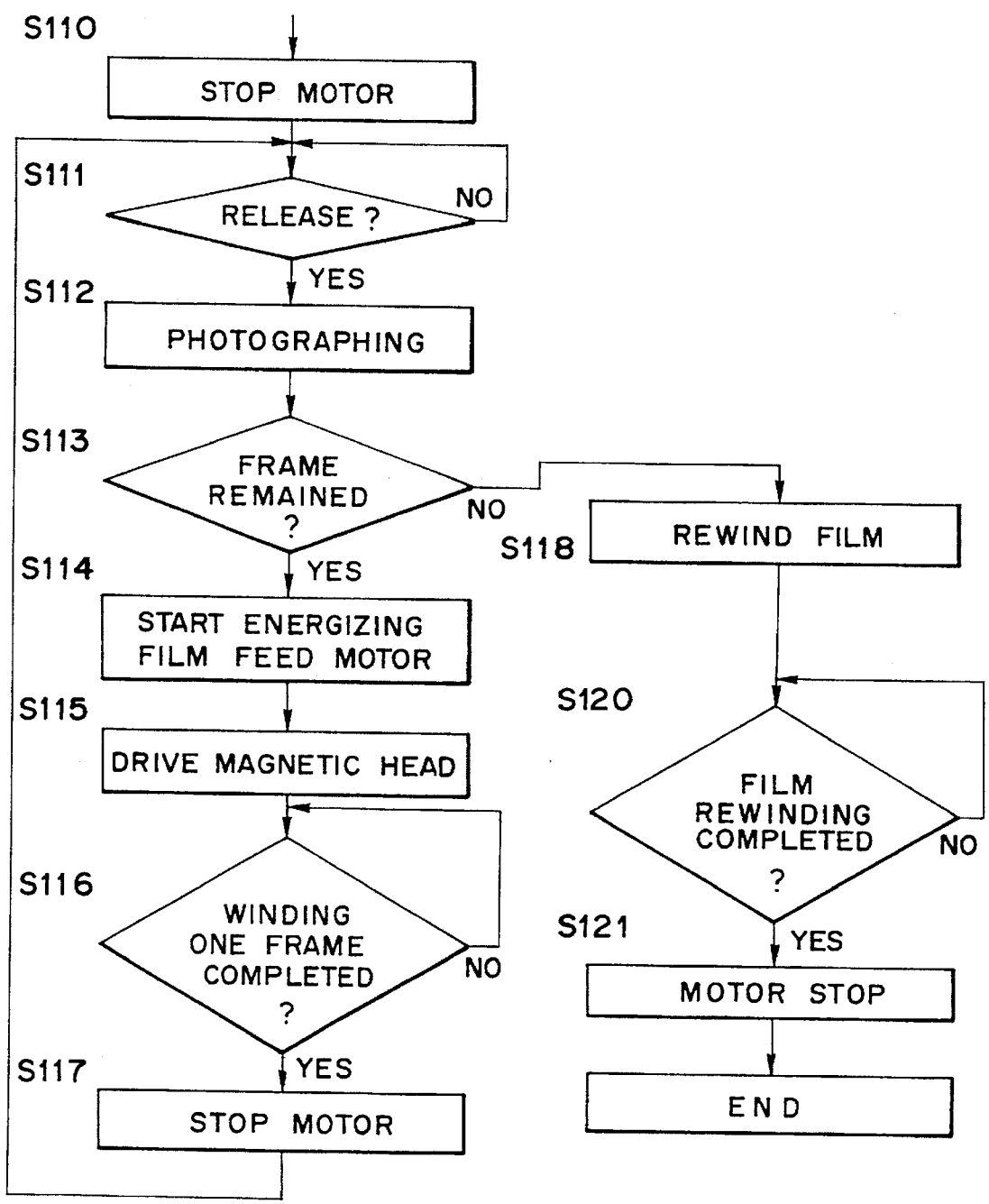
FIG. 28 is a flow chart showing an operation of the control circuit according to the seventh embodiment of the present invention.

FIGS. 27 and 28 are flow charts showing a sequence of the control circuit according to the seventh embodiment. The operation of the camera will be described below with reference to these flow charts.

In step 101 (to be referred to as S101 hereinafter; the same applies to the following steps), when the cartridge 33 is loaded in the camera, and the cartridge lid is closed, the switches 53 and 107 are turned on at the same time, and it is determined that the cartridge is loaded in the camera. The flow then advances to S102. In S102, the timer circuit is reset. In S103, since the cartridge 33 is loaded, a winding start signal is supplied to the film feed control circuit 109, and the film feed control circuit 109 supplies a voltage E1 to a film driving motor 1 to drive it. The voltage E1 is a voltage for giving a rotation speed suitable for reading out a bar code by the photoreflector to the driving motor. At this time, the film driving motor 1 is rotated in the direction of the arrow B, as shown in FIG. 2, and the thrust operation of the film 34 from the film cartridge 33 is started through the above-mentioned gear train. Immediately after the winding start signal is sent to the film feed control circuit 109 in S103, a time count operation is started by the timer circuit (S104). The photoreflector control circuit 67 is driven to cause the photoreflector 49 to read out information associated with the film, and written on the bar code disc 33a (S105). At this time, assume that a time required from the beginning of the timer up to the end of the information reading operation by the photoreflector 49 is represented by Ta. If the content of the timer reaches a predetermined time T1 (for T1≧Ta) (S106), the flow advances to S107; otherwise, the film feeding operation is continued. When the content of the timer reaches the predetermined time T1, since the information reading operation by the photoreflector 49 is ended, a voltage supplied from the film feed control circuit 109 to the film driving motor 1 is switched from E1 to E2 (for E1<E2) (S108). In S109, the perforations of the film are counted by a known means, e.g., a photointerrupter, thereby calculating a film feed amount. Alternatively, the number of revolutions of a roller urged against the film is counted by, e.g., a pulse plate, thereby calculating a film feed amount. Alternatively, the film feed amount is calculated based on a driving time of the motor to check if the first frame reaches an aperture portion. If it is determined that the first frame has reached the aperture portion, the flow advances to S110. In S110, the driving operation of the film driving motor 1 is stopped through the film feed control circuit 109, thereby stopping the winding operation of the film.

Upon completion of the above-mentioned operation, the flow advances to S111. In S111, it is checked if the release button is depressed to its first stroke, and the switch SWL is turned on. If YES in S111, the flow advances to S112, and a photometry means is driven to measure the brightness of an object. In addition, a distance measuring means is driven to calculate distance information to an object, and photographing operations such as a focusing operation of a photographing lens (not shown), an exposure operation to a film by controlling the shutter, and the like, are performed (S112). In S113, the number of times of release operations, a film feed amount, or the like is compared with the film frame count read out in S105 to check if frames remain. If YES in S113, the flow advances to S114; otherwise, the flow advances to S118. If film frames remain, the film feed control circuit 109 is driven to start the winding operation to the next frame (S114). During the winding operation of the film to the next frame, information such as photographing information (the shutter speed and the aperture value) in the photographing operations in S112, or a date is written in the magnetic storage portion of the film by the magnetic head 48 (S115). Thereafter, if it is determined by a known means, e.g., the above-mentioned method of counting film perforations by the photoreflector, or the method of detecting the film feed amount based on the count of the number of revolutions of a roller urged against the film, that the film is wound by one frame (S116), the flow advances to S117. The driving operation of the film driving motor 1 is stopped through the film feed control circuit 109 to stop the winding operation of the film, and the flow then returns to S111. When no film frame remains after the photographing operation, the film driving motor 1 is driven in the film rewinding direction through the film feed control circuit 109 to start the rewinding operation of the film (winding operation of the film into the film cartridge 33) (S118). When the film is rewound into the cartridge, and it is detected by a known means, e.g., a signal input from an input means (not shown) upon decision by a user, an elapse of a predetermined period of time for the rewinding operation of the film, or the above-mentioned method of detecting the film position by a photocoupler, that the film is completely rewound into the cartridge (S120), the flow advances to S121. The driving operation of the film driving motor 1 is stopped through the film feed control circuit 109, and thereafter, the operation of the overall camera is stopped (S121).

In this embodiment, the thrust type cartridge is used. However, the present invention may be applied to a camera, which uses a normal film cartridge, and feeds a film by a sprocket meshing with perforations of a film. The thrust type does not impose any limitations on this proposal. As a member which is rotated integrally with a film feed spool in a film cartridge, and on which information associated with a film is written, the present invention is not particularly limited to a disc on which information is written by a bar code. For example, a magnetically recorded disc may be used, and information may be read out by bringing a magnetic head to be in sliding contact with the disc. The present invention can be applied to this disc.

Figure 29:
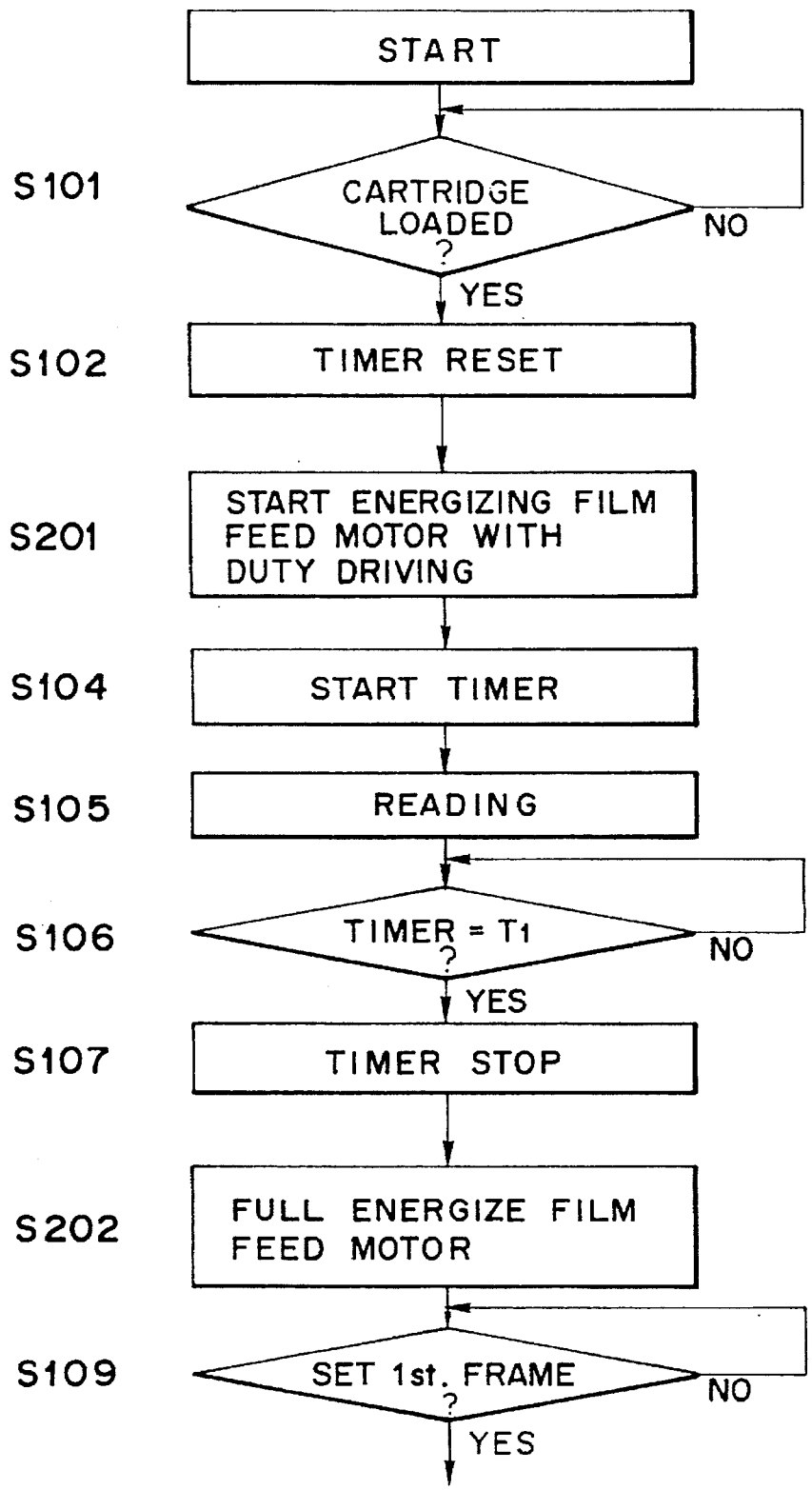
FIG. 29 is a flow chart showing an operation of a control circuit according to the eighth embodiment of the present invention.
Figure 30:
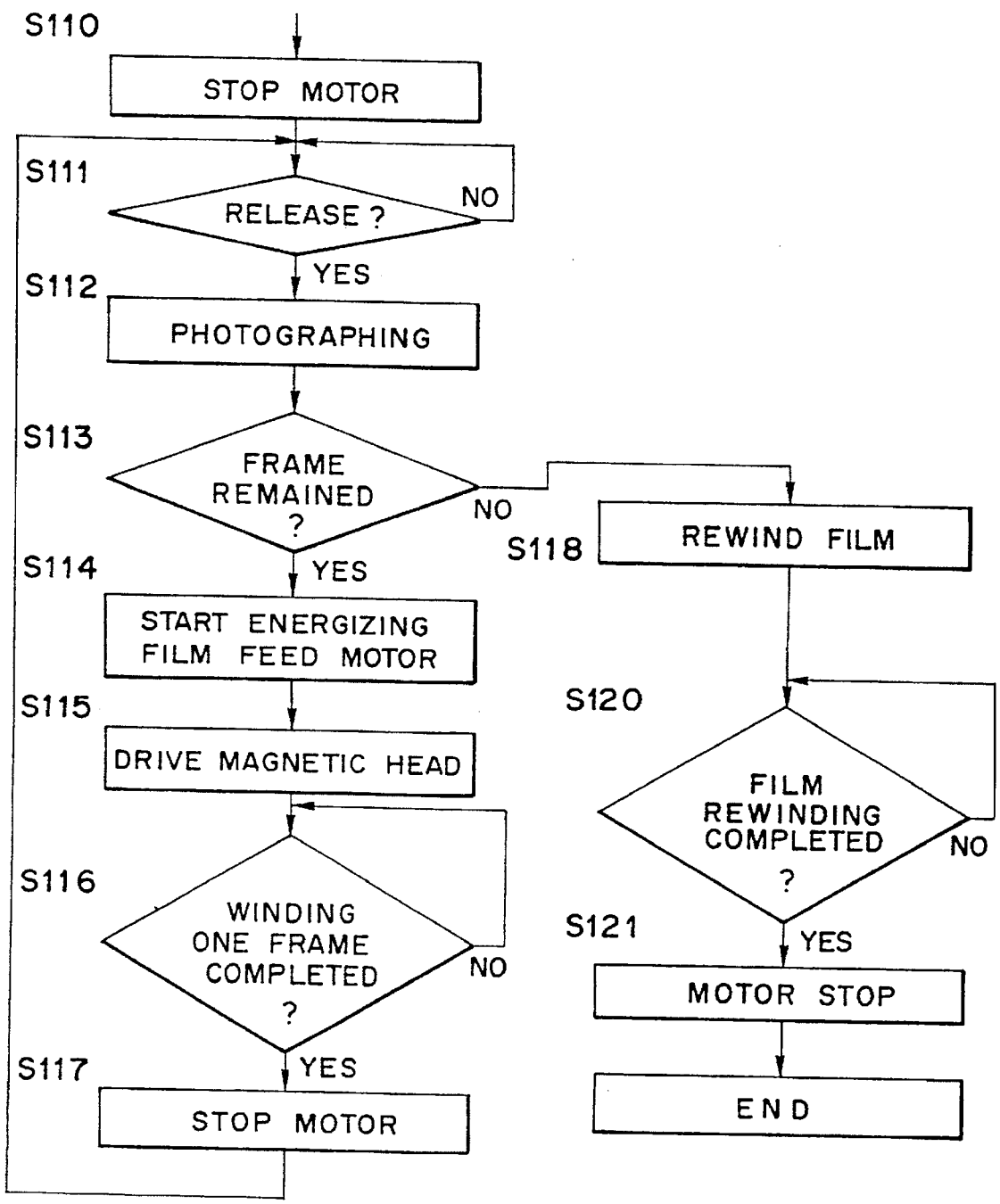
FIG. 30 is a flow chart showing an operation of the control circuit according to the eighth embodiment of the present invention.

FIGS. 29 and 30 are flow charts showing a sequence of a control circuit of a camera according to the eighth embodiment of the present invention.

Differences between this embodiment and the seventh embodiment are S201 and S202, and the same step numbers denote the steps of performing the same operations. In this embodiment, after a cartridge is loaded in the camera (S101), and the timer circuit is reset (S102), a winding start signal is supplied to the film feed control circuit 109, and the film feed control circuit 109 controls the film driving motor 1 to perform known duty driving for alternately performing energization and deenergization, so that the bar code disc can be rotated at a rotation speed suitable for a bar code reading operation by the photoreflector (S201). Since the information reading operation by the photoreflector is completed at the time of S202, the film feed control circuit 109 switches a driving method of the film driving motor 1 from the duty driving mode to a normal driving mode.

What is claimed is:

1. A camera having a recording medium take-up unit and a processing unit for writing information in and/or reading information from a recording portion provided on a recording medium having a tip end portion, said camera comprising:

feeding means for feeding the recording medium to the take-up unit at a set feed speed; and a control circuit for, when the recording medium is fed, setting the feed speed to a first speed at least until the tip end portion of the recording medium passes the processing unit and for setting the feed speed to a second speed thereafter prior to the tip end portion reaching the take-up unit, the first speed being lower than the second speed.

2. A camera according to claim 1, wherein the recording medium comprises a film, and the processing unit comprises a magnetic head unit.

3. A camera according to claim 2, wherein said feeding means comprises a film feed motor, and said control circuit applies a first driving electric power to the motor at least until a tip end portion of the film passes the magnetic head unit, and thereafter, applies a second electric power larger than the first driving electric power to the motor.

4. A camera having a processing unit for writing information in and/or reading information from a recording portion provided on a recording medium having a tip end portion, said camera comprising:

feeding means for feeding the recording medium at a set first speed;

mounting means for detachably mounting a high-speed feed unit to said camera for feeding the recording medium at a second speed higher than the first speed; and an inhibition circuit for, when the high-speed feed unit is mounted to said camera and the recording medium is fed, inhibiting a feed operation by the high-speed feed unit at least until a tip end portion of the recording medium passes the processing unit.

5. A camera according to claim 4, wherein the high-speed feed unit is externally attachably or detachably mountable to said camera by said mounting means.

6. A camera according to claim 4, wherein the recording medium comprises a film, and the processing unit comprises a magnetic head unit.

7. A camera according to claim 6, wherein said inhibition circuit inhibits the feed operation by the high-speed feed unit at least during a blank feed operation of the film.

8. A camera according to claim 6, wherein the high speed feed unit comprises a motor drive unit.

9. A camera according to claim 4, wherein the high-speed feed unit comprises a motor drive unit.

10. A camera according to claim 6, wherein said feeding means comprises a film feed motor, the high-speed feed unit comprises a power supply unit, and said inhibition circuit inhibits power supply by the power supply unit to the motor.

11. A camera according to claim 7, wherein said feeding means comprising a film feed motor, the high-speed feed unit comprises a power supply unit, and said inhibition circuit inhibits power supply by the power supply unit to the motor.

12. A camera having a processing unit for writing information in and/or reading information from a recording portion provided on a recording medium having a tip end portion, said camera comprising:

feed control means for selectively performing a feed operation of the recording medium at one of a first feed speed and a second speed higher than the first feed speed; and a control circuit for, when a feed operation at the second feed speed is selected, causing said feed control means to perform the feed operation at the first feed speed at least until the tip end portion of the recording medium passes the processing unit, and thereafter, permitting said feed control means to perform the feed operation at the second feed speed.

13. A camera according to claim 12, wherein said control circuit permits said feed control means to perform the feed operation at the second feed speed prior to the tip end portion reaching a take-up unit.

14. A camera according to claim 12, wherein the recording medium comprises a film, and the processing unit comprises a magnetic head unit.

15. A camera according to claim 14, wherein when said feed control means selects the feed operation at the second feed speed, said permission circuit causes said feed control means to perform the feed operation at the first feed speed at least during a blank feed operation of the film, and thereafter, permits said feed control means to perform the feed operation at the second feed speed.

16. A camera using a film cartridge comprising a film, a film feed spool, and an information member that is rotated according to rotation of the film feed spool, said camera comprising:

reading means for reading information from the information member during movement of the information member;

feeding means for feeding the film; and a control circuit for controlling the film feed speed, said control circuit setting the feed speed to a first speed at least during an information reading operation by said reading means and setting the feed speed to a second speed at a time when said reading means does not perform the information reading operation, the first speed being lower than the second speed.

17. A camera according to claim 16, wherein said reading means performs the information reading operation when said feeding means begins feeding the film from the cartridge.

18. A camera according to claim 16, wherein the information member comprises a rotary disc, and symbolic information is provided on a surface of the information member.

19. A camera according to claim 18, wherein said reading means comprises a photoreflector.

20. A camera having a processing unit for writing information in and/or reading information from a recording portion provided on a recording medium having a tip end portion, comprising:

feeding means for feeding the recording medium at a set feed speed;

detection means for, when the recording medium is fed by said feeding means, detecting when the tip end portion of the recording medium reaches the processing unit; and a control circuit for setting the feed speed to a first speed at least until said detection means detects the tip end portion of the recording medium at the processing unit and for setting the feed speed to a second speed thereafter prior to the tip end portion reaching a take-up unit, the first speed being lower than the second speed.

21. A camera according to claim 20, wherein the recording medium comprises a film, and the processing unit comprises a magnetic head unit.

22. A camera having a processing unit for writing information in and/or reading information from a recording portion provided on a recording medium having a tip end portion, said camera comprising:

feeding means for feeding the recording medium at a set first speed;

mounting means for detachably mounting a high-speed feed unit to said camera for feeding the recording medium at a second speed higher than the first speed; and a control circuit for, when the high-speed feed unit is mounted to said camera and the recording medium is fed, inhibiting a feed operation by the high-speed feed unit at least until a tip end portion of the recording medium passes the processing unit, and thereafter, permitting the feed operation by the high-speed feed unit.

23. A camera according to claim 22, wherein the high-speed feed unit is externally attachably or detachably mountable to said camera by said mounting means.

24. A camera according to claim 22, wherein the recording medium comprises a film, and the processing unit comprises a magnetic head unit.

25. A camera according to claim 24, wherein said control circuit inhibits the feed operation by the high-speed feed unit at least during a blank feed operation of the film.

26. A camera according to claim 25, wherein the high-speed feed unit comprises a motor drive unit.

27. A camera according to claim 26, wherein the high-speed feed unit comprises a motor drive unit.

28. A camera according to claim 24, wherein said feeding means comprises a film motor, the high-speed feed unit comprises a power supply unit, and said control circuit inhibits power supply by the power supply unit to the motor.

29. A camera according to claim 25, wherein said feeding means comprises a film feed motor, the high-speed feed unit comprises a power supply unit, and said control circuit inhibits power supply by the power supply unit to the motor.

30. A camera having a magnetic head unit for writing information in and/or reading a signal from a magnetic recording portion provided on a film, said camera comprising:

feeding means for feeding the film at a set film feed speed;

a detection circuit for detecting a signal which is read by the head unit; and a control circuit for, after the tip end portion of the film is started to feed to a head direction, setting the film feed speed to a first speed at least until a signal read-out by the head unit is detected by the detection circuit and for setting the film feed speed to a second speed which is faster than the first speed after the signal read-out is detected by the detection circuit and prior to the tip end portion reaching a take-up unit.

31. A camera having a take-up spool and a magnetic head unit for writing a signal in and/or reading a signal from a magnetic recording portion provided on a film, the film having a tip end portion and being contained in a cartridge, said camera comprising:

a motor for feeding the film;

a first transporting portion for feeding the film from the cartridge toward the take-up spool at a first speed using a rotational force of said motor;

a second transporting portion for transporting the film at a second speed by rotation of the take-up spool using said motor after the film is wound around the take-up spool, the second speed being set to be greater than the first speed; and a control circuit for applying a first amount of electric energy to said motor at least until the tip end portion of the film reaches the magnetic head unit, and thereafter, and prior to the tip end portion reaching a take-up spool, applying a second amount of electric energy to said motor that is greater than the first amount of electric energy.

32. A camera according to claim 31, wherein said control circuit applies the first amount of electric energy to said motor at least until the film is wound around the take-up spool.

33. A camera according to claim 31, wherein said control circuit applies the first amount of electric energy to said motor during a blank feeding of the film.

34. A camera using a film cartridge comprising a film, a film spool, and an information member that is rotated according to rotation of the film spool, said camera comprising:

reading means for reading information from the information member during movement of the information member;

driving means for driving the film spool at a set speed; and a control circuit for controlling a driving speed of the film spool, said control circuit setting the driving speed to a first speed at least during an information reading operation by said reading means and setting the driving speed to a second speed at a time when said reading means does not perform the information reading operation, the first speed being lower than the second speed.

35. A camera using a film cartridge comprising a film, a film feed spool, and an information member that is rotated according to rotation of the film feed spool, said camera comprising:

reading means for reading information from the information member during movement of the information member;

a feeding mechanism for rotating the feed spool and the information member, and for feeding the film; and control means, coupled with the feeding mechanism, for rotating the film feed spool at a first speed at least during an information reading operation by said reading means, and for setting a film feed speed to a second speed at a time when said reading means is not performing an information reading operation, the second speed being faster than a film feed speed at a time when the film feed spool is rotated at the first speed.

* * * * *

UNITED STATES PATENT AND TRADEMARK OFFICE
CERTIFICATE OF CORRECTION

PATENT NO. : 5,664,246
DATED : September 2, 1997
INVENTOR(S) : MASAAKI ISHIHARA, ET AL.

It is certified that error appears in the above-identified patent and that said Letters Patent is hereby corrected as shown below:

On the title page item [56],
<u>References Cited</u>

FOREIGN PATENT DOCUMENTS,
"5522799  2/1980  Japan" should read
--55-22799 2/1980  Japan--.

"0395532  4/1991  Japan" should read
--3-95532 4/1991  Japan--.

<u>Column 10</u>

Line 53, " "O" " should read --"O".--.

<u>Column 13</u>

Line 66, "Signal" should read --signal--.

<u>Column 15</u>

Line 58, "instep" should read --in step--.

<u>Column 20</u>

Line 66, "claim 4," should read --claim 7,--.

UNITED STATES PATENT AND TRADEMARK OFFICE
CERTIFICATE OF CORRECTION

PATENT NO. : 5,664,246
DATED : September 2, 1997
INVENTOR(S) : MASAAKI ISHIHARA, ET AL.

It is certified that error appears in the above-identified patent and that said Letters Patent is hereby corrected as shown below:

Column 21

Line 1, "said" should read --the--.
    Line 6, "comprising" should read --comprises--.

Column 22

Line 43, "claim 25," should read --claim 24,--.
    Line 44, "claim 26, should read --claim 25,--.

Signed and Sealed this

Twenty-eighth Day of April, 1998

Attest:

BRUCE LEHMAN

Attesting Officer      Commissioner of Patents and Trademarks